US006723439B2

(12) United States Patent
Amidaiji et al.

(10) Patent No.: US 6,723,439 B2
(45) Date of Patent: Apr. 20, 2004

(54) CURABLE COMPOSITION, COATING COMPOSITION, PAINT, ANTIFOULING PAINT, CURED PRODUCT THEREOF AND METHOD OF RENDERING BASE MATERIAL ANTIFOULING

(75) Inventors: Katsuyoshi Amidaiji, Ohtake (JP); Toshiharu Yamamoto, Ohtake (JP); Hironobu Muramatsu, Matsuida-machi (JP)

(73) Assignees: Chugoku Marine Paints, Ltd., Hiroshima (JP); Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/101,611

(22) Filed: Mar. 20, 2002

(65) Prior Publication Data

US 2002/0197490 A1 Dec. 26, 2002

Related U.S. Application Data

(62) Division of application No. 09/680,929, filed on Oct. 10, 2000, now Pat. No. 6,451,437.

(30) Foreign Application Priority Data

Oct. 13, 1999 (JP) ............................................ 11-291642
Nov. 17, 1999 (JP) ............................................ 11-327507

(51) Int. Cl.[7] ................................................. B32B 9/04
(52) U.S. Cl. ........................ 428/447; 523/200; 523/212; 523/216; 524/588; 524/789; 528/33; 528/34; 427/387

(58) Field of Search ......................... 428/497; 523/200, 523/212, 206; 524/588, 789; 525/477; 528/33, 34; 427/387

(56) References Cited

U.S. PATENT DOCUMENTS

| 4,910,252 A | 3/1990 | Yonehara et al. |
| 5,039,736 A | 8/1991 | Fujiki |
| 5,087,684 A | 2/1992 | Perrin |
| 5,218,059 A | 6/1993 | Kishihara et al. |
| 5,607,997 A | 3/1997 | Kimura et al. |
| 5,663,215 A | 9/1997 | Milligan |
| 5,958,116 A | 9/1999 | Kishihara et al. |
| 6,451,437 B1 * | 9/2002 | Amidaiji et al. ............ 428/447 |

FOREIGN PATENT DOCUMENTS

| JP | 632995 | 1/1988 |
| JP | 2522854 | 5/1996 |
| JP | 10-316933 | 12/1998 |

* cited by examiner

Primary Examiner—Robert Dawson
Assistant Examiner—Christopher Keehan
(74) Attorney, Agent, or Firm—Sherman & Shalloway

(57) ABSTRACT

A curable composition comprising (A) an organopolysiloxane having functional groups capable of condensation reaction at both molecular terminals thereof and (B-1) a hydrophobic silica and a hydrophilic silica. A curable composition comprising (A) an organopolysiloxane having functional groups capable of condensation reaction at both molecular terminals thereof and (B-2) a hydrophobic silica, wherein the hydrophobic silica (B-2) is thermally treated together with the organopolysiloxane (A).

16 Claims, No Drawings

CURABLE COMPOSITION, COATING COMPOSITION, PAINT, ANTIFOULING PAINT, CURED PRODUCT THEREOF AND METHOD OF RENDERING BASE MATERIAL ANTIFOULING

This application is a divisional of application Ser. No. 09/680,929 filed on Oct. 10, 2000 now U.S. Pat. No. 6,451,437.

FIELD OF THE INVENTION

The present invention relates to a curable composition, a coating composition, a paint, an antifouling paint, cured products thereof and a method of rendering a base material antifouling. More particularly, the present invention is concerned with a curable composition which is excellent in, for example, sprayability and enables forming a thick coating film by one coating. The curable composition enables shortening the operating period for coating, and a coating film of uniform thickness can be obtained by the application thereof. The obtained coating film is excellent in film strength, film hardness, rubber properties, etc. and, for example, exerts excellent antifouling capability for a prolonged period of time. Further, the curable composition ensures excellent storage stability before application thereof. Thus, the present invention is further concerned with a coating composition, a paint, an antifouling paint, cured products thereof and a method of rendering antifouling a base material such as an underwater structure or a ship shell plate.

BACKGROUND OF THE INVENTION

In the production of curable silicone rubber compositions, it is common practice to load the composition, irrespective of being the one-package type or the two-package type, with a hydrophilic silica or a hydrophobic silica having its surface treated with, for example, hexamethyldisilazane in order to ensure satisfactory exertion of properties such as surface smoothness and rubber strength after curing.

However, the affinity of the hydrophilic silica with silicone oil is poor, so that aggregates of fillers such as the silica occur in the cured silicone rubber compositions. Rubbers with excellent properties cannot be obtained by curing of these curable silicone rubber compositions. On the other hand, the affinity of the hydrophobic silica with silicone oil is so high that aggregation in the compositions is scarce. Silica is relatively satisfactorily dispersed therein, and the thixotropy thereof is relatively satisfactory. Thus, it is expected that the compositions, even when applied to, for example, a vertical surface, can form a thick coating film by one-time application thereof. However, these compositions have high viscosity and accordingly exhibit poor sprayability. Further, these compositions, when diluted with a solvent, rapidly lose thixotropy to thereby cause such problems that the coating film suffers from sagging and that the smoothness of the coating film is deteriorated.

For example, first, Japanese Patent Laid-open Publication No. 10(1998)-316933 discloses a paint composition comprising, as principal components, a room temperature curable silicone rubber having a number average molecular weight of 20,000 to 100,000 (a), a room temperature curable silicone rubber having a number average molecular weight of 500 to 20,000 (b) and a silicone oil (c), and also discloses a paint composition further loaded with a hydrophobic fumed silica (d). This paint composition characterized by loading two types of silicone rubbers differing in molecular weight with a hydrophobic fumed silica, although can form a thick coating film by one-time application, poses the following problems. That is, the storage stability of the paint composition is poor. The paint composition, during the preparation and storage, may be gelatinized probably due to the secondary aggregation of silica, so that the sprayability thereof is poor at the time of application. At the formation of coating film, the surface of the coating film becomes nonuniform (film thickness and tone are nonuniform, and coating marks are observable), with the result that a coating film which is excellent in film thickness, rubber strength, etc. cannot be obtained.

Apart from the above, for example, underwater structures and fishing nets are used in water, especially sea water, for a prolonged period of time. Thus, when a multiplicity of sea lives, such as hydrozoans, Bugula, sea lettuces, green lavers, serpulas and oysters, adhere to parts in contact with sea water and breed there, there is the danger of deterioration of the inherent functions of the underwater structures and fishing nets. In particular, underwater structures, such as supply water inlets and waste water outlets, for thermal power plants and nuclear power plants are constructed and fixed at given positions in the sea, and culture nets and stationary nets are placed in the sea for a prolonged period of time. Therefore, they are likely to suffer from erosion due to the sea lives and to suffer from conspicuous breeding of the sea lives, so that frequent replacement and cleaning thereof are inevitable. These cause a serious economic loss.

In order to resolve the above problems, it is common practice to apply an antifouling paint to the surface of underwater structures, fishing nets, sea water utilizing apparatus, etc. so as to prevent the sticking of sea lives.

For example, secondly, Japanese Patent Publication No. 63(1988)-2995 discloses a nonpoisonous antifouling paint composition obtained by mixing together a silicone rubber curable by chemical reaction, a petrolatum or liquid paraffin mixture and a low-viscosity silicone oil. In this reference, it is described that application of the paint composition to parts of undersea structure brought into contact with sea water enables preventing sticking and growth of sea lives for a prolonged period of time. However, with the use of this nonpoisonous antifouling paint composition, it is difficult to obtain a satisfactory film thickness by one-time application. Further, there is the problem that the obtained coating film is poor in strength and hardness and is hence likely to suffer from scratching.

Moreover, thirdly, in Japanese Patent No. 2,522,854 granted on the invention formerly proposed by the present applicants, there is disclosed a curable organopolysiloxane composition, together with a product curing thereof, comprising as principal components (A) an organopolysiloxane having its both molecular chain terminals blocked by a silanol group or a hydrolyzable group, (B) an organosilane represented by the formula: $R^1{}_a SiX_{4-a}$ (wherein $R^1$ represents an unsubstituted or substituted monovalent hydrocarbon group having 1 to 8 carbon atoms; X represents a hydrolyzable group; and a is 0 or 1), or a partial hydrolyzate of the organosilane, and (C) an organopolysiloxane containing, per molecule, at least one group of the formula: $\equiv SiR^2OSiR^3{}_b Y_{3-b}$ (wherein $R^2$ represents an unsubstituted or substituted divalent hydrocarbon group or a divalent hydrocarbon group containing an ether bond; $R^3$ represents an unsubstituted or substituted monovalent hydrocarbon group; Y represents a hydrolyzable group; and b is 0, 1 or 2, provided that, when $R^2$ represents a divalent hydrocarbon group containing an ether bond, an organopolysiloxane wherein two or more trimethylsiloxy groups are bonded to the Si atom to which a carbon atom of the hydrocarbon group is directly bonded is excluded). Further, it is described in the patent that the organopolysiloxane composition can be loaded with, as fillers, not only particulate silica, fumed silica, precipitated silica and the like but also those whose surface has been rendered hydrophobic with the use of, for example, a silane. Still further, it is described in the patent that the cured is free from the danger of environmental pollution and that the antifouling effect persists for a prolonged period of time. However, with respect to the curable organopolysiloxane composition described in the patent, not only is there room for improvement in the thickness increase, strength, hardness, etc. of the coating film but also the problem of poor resistance to scratching is posed.

Moreover, the antifouling paint composition described in the first reference Japanese Patent Laid-open Publication No. 10(1998)-316933, although can form a thick coating film by one-time application as aforementioned, has poor storage stability in the use as a paint, exhibits poor sprayability at the time of coating and causes the coating film to have a nonuniform surface (film thickness and tone are nonuniform, and coating marks are observable) at the time of coating film formation. Thus, desirable coating films cannot be formed therefrom, and, especially in the use as an antifouling coating film, the problem that the coating film is poor in long-term antifouling properties is posed.

OBJECT OF THE INVENTION

The present invention has been made with a view toward solving the above problems of the prior art. It is an object of the present invention to provide a curable composition which is excellent in properties such as low viscosity and high thixotropy with a good balance thereof and which can form a thick coating film by one-time application, the coating film upon curing being excellent in properties such as rubber strength and surface smoothness with a good balance thereof.

It is another object of the present invention to provide a curable composition (specifically a coating composition, a curable paint composition or an antifouling paint composition) which, when used as a coating material, especially a paint, exhibits excellent sprayability and enables forming a thick coating film by one-time application to thereby enable shortening the operating period for coating. A desirable coating film which is excellent in the uniformity of coating film surface can be obtained by the application thereof, which coating film is also excellent in film strength and film hardness and, when used for antifouling purposes, exerts excellent antifouling capability for a prolonged period of time. Further, the curable composition ensures excellent storage stability before application thereof.

It is a further object of the present invention to provide, by the use of the curable composition as a coating material, especially paint, as mentioned above, an electrical part, a building material, a craftwork object, an apparel industry supply and a medical supply which are excellent in properties such as film strength, film hardness and surface smoothness. It is still a further object of the present invention to provide, by the use of the curable composition as an antifouling paint, an antifouling coating film which exhibits excellent antifouling capability for a prolonged period of time or, for example, an underwater structure or a ship shell plate covered with the coating film.

It is an even further object of the present invention to provide a process for producing a curable composition, a coating composition or a curable (antifouling) paint composition, from which a thick coating film of the above properties can be obtained preferably by one-time application.

It is yet an even further object of the present invention to provide a method of forming a coating film on the surface of, for example, an electrical part or a method of rendering antifouling the surface of a base material such as a ship shell plate, an underwater structure or a fishing net, wherein the above coating film with excellent properties can be efficiently formed on the surface of various base materials such as an underwater structure in a manner ensuring worker's safety and free from the danger of environmental pollution.

SUMMARY OF THE INVENTION

The first curable composition of the present invention comprises:

(A) an organopolysiloxane having functional groups capable of condensation reaction at both molecular terminals thereof, and (B-1) a hydrophobic silica and a hydrophilic silica.

The second curable composition of the present invention comprises:

(A) an organopolysiloxane having functional groups capable of condensation reaction at both molecular terminals thereof, and (B-2) a hydrophobic silica, wherein the hydrophobic silica (B-2) is thermally treated together with the organopolysiloxane (A).

The hydrophobic silica (B-2) may be thermally treated together with part of the organopolysiloxane (A) or all of the organopolysiloxane (A).

In the present invention, it is preferred that the organopolysiloxane (A) be represented by the formula:

[α]

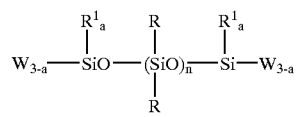

wherein W represents a hydroxyl group or a hydrolyzable group; each of $R^1$ and R independently represents an unsubstituted or substituted monovalent hydrocarbon group having 1 to 12 carbon atoms, provided that the hydrocarbon groups $R^1$ as well as the hydrocarbon groups R may be identical with or different from each other; n is an integer of 5 or greater; and a is 0, 1 or 2.

In the present invention, when, in the formula [α], W represents a hydroxyl group and a is 2, it is preferred that, in addition to the component (A) and component (B-1) or (B-2), the curable composition contains:

(C) an organosilane represented by the formula:

$$R^1_b SiX_{4-b}$$ [I]

wherein $R^1$ represents an unsubstituted or substituted monovalent hydrocarbon group having 1 to 8 carbon atoms; X represents a hydrolyzable group; and b is 0 or 1, or a partial hydrolyzate of the organosilane.

In the first curable composition of the present invention, it is preferred that, among the components (B-1), at least the hydrophilic silica, especially both the hydrophilic silica and the hydrophobic silica, be thermally treated at 100° C. or higher together with the organopolysiloxane (A).

In the second curable composition of the present invention, it is preferred that the hydrophobic silica be thermally treated at 100° C. or higher together with the organopolysiloxane (A).

In the present invention, preferably, the curable composition contains the component (B-1) or (B-2) in an amount of 1 to 100 parts by weight per 100 parts by weight of the organopolysiloxane (A).

Further, the curable composition of the present invention preferably contains the component (C) in an amount of 1 to 20 parts by weight per 100 parts by weight of the organopolysiloxane (A).

In the first curable composition of the present invention, it is preferred that the hydrophobic silica (a) and the hydrophilic silica (b) be contained at a weight ratio ((a)/(b)) of 1/99 to 99/1.

In the present invention, further, a silicone oil (D) is preferably contained in a total amount of 0.1 to 200 parts by weight per 100 parts by weight of the organopolysiloxane (A).

In the present invention, further, a catalyst, an antifouling agent and/or a colorant is preferably contained in the curable composition.

The process for producing the first curable composition according to the present invention comprises heating the organopolysiloxane (A) and at least the hydrophilic silica among the hydrophobic silica and hydrophilic silica (B-1) at 100° C. or higher.

The coating composition of the present invention comprises any of the above curable compositions.

In the present invention, the coating composition is preferably used as a paint or an antifouling paint.

The cured product of the present invention is obtained by curing any of the above curable compositions.

The coating film or antifouling coating film of the present invention is obtained by application and curing any of the above curable compositions (especially, antifouling paint).

The coated base material of the present invention comprises a base material having its surface covered with a coating film obtained by curing any of the above curable compositions (especially, coating compositions). The base material is, for example, an electrical part, an electronic part, a building material, a craftwork object, an apparel industry supply or a medical supply.

The method of forming a coating film on a surface of a base material according to the present invention comprises coating or impregnating a surface of a base material, such as an electrical part, with a coating composition comprising any of the above curable compositions, and subsequently curing the coating composition to thereby form a coating film.

The antifouling base material of the present invention comprises a base material brought into contact with sea water or fresh water, having its surface covered with a coating film obtained by curing any of the above curable compositions (especially, antifouling paints). The base material is preferably any of underwater structures, ship shell plates, fishing nets and fishing gears.

The method of rendering a base material antifouling according to the present invention comprises coating or impregnating a surface of a base material, such as an underwater structure, with an antifouling paint comprising any of the above curable compositions, and subsequently curing the antifouling paint to thereby form an antifouling coating film.

By virtue of the present invention, there is provided a curable composition which is excellent in properties such as low viscosity and high thixotropy with a good balance thereof and which can form a thick coating film by one-time application, the coating film upon curing being excellent in properties such as rubber strength and surface smoothness with a good balance thereof.

Further, by virtue of the present invention, there is provided a curable composition which, especially when used as a coating composition or a paint, exhibits excellent sprayability and enables forming a thick coating film by one-time application to thereby enable shortening the operating period for coating. A coating film of uniform thickness can be obtained by the application thereof, which coating film is also excellent in film strength and film hardness and, when used for antifouling purposes, exerts excellent antifouling capability for a prolonged period of time. Furthermore, the curable composition ensures excellent storage stability before application thereof.

The above curable composition is suitable for use as a coating composition, especially a curable paint composition or an antifouling paint composition.

The cured product, especially coating composition cured product, of the present invention is excellent in rubber properties such as surface gloss, rubber hardness and tensile strength with a good balance thereof. In particular, the (antifouling) coating film and the underwater structure or ship shell plate wherein the base material surface is covered with the antifouling coating film exhibit excellent antifouling capability for a prolonged period of time.

The process for producing a curable composition according to the present invention enables forming a coating of desired thickness on a surface of, for example, a vertically erected base material by one-time application. The process enables producing a curable composition such as a coating material or a paint, especially an antifouling paint, ensuring high coating efficiency.

The method of rendering antifouling the surface of a base material according to the present invention enables efficiently forming the above desired coating film with excellent properties on the surface of various base materials such as an underwater structure in a manner ensuring worker's safety and free from the danger of environmental pollution.

DETAILED DESCRIPTION OF THE INVENTION

The curable composition, coating composition, paint, antifouling paint, cured product thereof and method of rendering a base material antifouling according to the present invention will be described in detail below.

Curable Composition

The first curable composition of the present invention (also referred to as "the first invention") comprises:
(A) an organopolysiloxane having functional groups capable of condensation reaction at both molecular terminals thereof (terminals of chain molecule or main chain of molecule), and
(B-1) a hydrophobic silica and a hydrophilic silica.

The second curable composition of the present invention (also referred to as "the second invention") comprises:
(A) an organopolysiloxane having functional groups capable of condensation reaction at both molecular terminals thereof (terminals of chain molecule or main chain of molecule), and
(B-2) a hydrophobic silica,
wherein the hydrophobic silica (B-2) is thermally treated together with the organopolysiloxane (A).

The hydrophobic silica (B-2) may be thermally treated together with part of the organopolysiloxane (A) or all of the organopolysiloxane (A).

First, the organopolysiloxane (A) will be described.

Organopolysiloxane (A)

The polymer, preferably liquid polymer, constituting a main component of organosilicone as described in Japanese Patent No. 2,522,854 is used as the organopolysiloxane (A). This organopolysiloxane (A) is preferably represented by the formula:

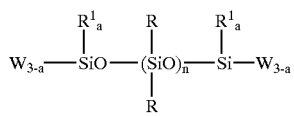

[α]

wherein W is a functional group capable of condensation reaction and represents a hydroxyl group (—OH) or a hydrolyzable group; each of $R^1$ and R independently represents an unsubstituted or substituted monovalent hydrocarbon group having 1 to 12 carbon atoms, provided that the hydrocarbon groups $R^1$ as well as the hydrocarbon groups R may be identical with or different from each other; n is an integer of 5 or greater; and a is 0, 1 or 2.

In this formula [α], when a=0 or 1, it is preferred that W represent a hydrolyzable group. On the other hand, when a=2, it is preferred that W represent a hydroxyl group (—OH).

In the present invention, when, in the formula [α], W represents a hydroxyl group and a is 2, it is preferred that, in addition to the component (A) and component (B-1) or (B-2), the curable composition contains (C) an organosilane represented by the formula:

 [I]

wherein $R^1$ represents an unsubstituted or substituted monovalent hydrocarbon group having 1 to 8 carbon atoms; X represents a hydrolyzable group; and b is 0 or 1, or a partial hydrolyzate of the organosilane.

The organopolysiloxane (A) represented by the formula [α] will now be described in greater detail.

When W of the formula [α] represents a hydrolyzable group, it can be, for example, any of an alkoxy group, an acyloxy group, an alkenyloxy group, an iminoxy group, an amino group, an amido group and an aminoxy group. Of these, an alkoxy group is preferred.

The alkoxy group is preferably one wherein the total number of carbon atoms is 1 to 10. At least one oxygen atom may be present between carbon atoms thereof. For example, the alkoxy group can be any of methoxy, ethoxy, propoxy, butoxy, methoxyethoxy and ethoxyethoxy.

The acyloxy group is preferably an aliphatic or aromatic group represented by the formula RCOO— (wherein R represents an alkyl group having 1 to 10 carbon atoms or an aromatic group having 6 to 12 carbon atoms). For example, the acyloxy group can be any of acetoxy, propionoxy, butyloxy and benzoyloxy.

The alkenyloxy group is preferably one having about 3 to 10 carbon atoms. It can be, for example, any of isopropenyloxy, isobutenyloxy and 1-ethyl-2-methylvinyloxy.

The iminoxy group (RR'C=N—O—, also known as an oxyimino group or a ketoxime group) is preferably one having about 3 to 10 carbon atoms. It can be, for example, any of dimethyl ketoxime, methyl ethyl ketoxime, diethyl ketoxime, cyclopentanoxime and cyclohexanoxime groups.

The amino group is preferably one having 1 to 10 carbon atoms. It can be, for example, any of N-methylamino, N-ethylamino, N-propylamino, N-butylamino, N,N-dimethylamino, N,N-diethylamino and cyclohexylamino groups.

The amido group is preferably one wherein the total number of carbon atoms is 2 to 10. It can be, for example, any of N-methylacetamido, N-ethylacetamido and N-methylbenzamido groups.

The aminoxy group is preferably one wherein the total number of carbon atoms is 2 to 10. It can be, for example, either of N,N-dimethylaminoxy and N,N-diethylaminoxy groups.

Each of $R^1$ and R independently represents an unsubstituted or substituted monovalent hydrocarbon group having 1 to 12, preferably 1 to 10, still preferably 1 to 8, carbon atoms. Such monovalent hydrocarbon group can be, for example, any of alkyl, alkenyl, aryl, cycloalkyl and aralkyl groups.

The alkyl group can be any of linear, branched and alicyclic alkyl groups. It is preferred that the alkyl group be a linear or branched alkyl group having about 1 to 10, especially 1 to 8, carbon atoms or a cycloalkyl group having 3 to 6 carbon atoms.

This linear or branched alkyl group can be, for example, any of methyl, ethyl, propyl, butyl, 2-ethylbutyl and octyl. Of these, methyl is especially preferred.

The alkenyl group is preferably one having about 2 to 10, still preferably 2 to 8, carbon atoms. It can be, for example, any of vinyl, hexenyl and allyl.

The aryl group is preferably one having about 6 to 15, still preferably 6 to 12, carbon atoms. It can be, for example, any of phenyl, tolyl, xylyl, naphthyl and diphenyl. Of these, phenyl is especially preferred.

The cycloalkyl group is preferably one having 3 to 8, still preferably 3 to 6, carbon atoms. It can be, for example, cyclohexyl or cyclopentyl.

The aralkyl group is preferably one wherein the total number of carbon atoms is about 7 to 10, still preferably 7 to 8, carbon atoms. It can be, for example, benzyl or 2-phenylethyl.

Some or all of the hydrogen atoms, bonded to the carbon atoms, of these groups $R^1$ may be replaced by, for example, a halogen atom such as F, Cl, Br or I or a cyano group. As such a halogenated alkyl group, there can be mentioned, for example, chloromethyl, 3,3,3-trifluoropropyl or 2-cyanoethyl.

Among the groups R, unsubstituted monovalent hydrocarbon groups are preferred. Methyl and phenyl are especially preferred.

When a plurality of groups $R^1$ and a plurality of groups R are present in the organopolysiloxane (A) represented by the formula [α], these plurality of groups $R^1$, plurality of groups R as well as groups $R^1$ and R may be identical with or different from each other.

Although the viscosity at 25° C. of the organopolysiloxane (A) is varied depending on the use of the employed curable composition and cannot be indiscriminately specified, it is generally preferred from the viewpoint of the applicability of the obtained composition and the antisagging properties of a solvent dilution of the obtained composition that the viscosity be in the range of 25 to 1,500,000 cS, especially 25 to 500,000 cS, still especially 500 to 200,000 cS, and yet still especially 1,000 to 100,000 cS.

Hydrophobic Silica and Hydrophilic Silica (B)

There are various silicas, for example, hydrophilic silicas (silica with an untreated surface), such as wet process silica (silica hydrate) and dry process silica (fumed silica or anhydrous silica); and hydrophobic silicas with a treated surface, such as hydrophobic wet silica and hydrophobic fumed silica.

The first curable composition of the present invention contains a mixture of a hydrophobic silica and a hydrophilic silica as silica component (B-1). In the second curable composition of the present invention, a hydrophobic silica thermally treated together with the organopolysiloxane (A) as aforementioned is used as silica component (B-2). Thus, the coating material (coating composition) or paint, especially antifouling paint, from the obtained curable composition is highly stable during the preparation, safekeeping and storage, exhibits satisfactory thixotropy and can form a thick coating film by one-time application. The obtained coating film is excellent in rubber properties such as hardness, tensile strength and elongation with a good balance thereof, and, when used as an antifouling coating film, is superior in antifouling properties.

In the first curable composition of the present invention, silicas with the below mentioned properties can be used directly without any treatment as the silica component. In a preferred mode, however, at least the hydrophilic silica among the silica components (B-1), namely the hydrophobic silica and hydrophilic silica, should be thermally treated together with part or all of the organopolysiloxane (A), as described in detail below. It is still preferred that both the hydrophilic silica and the hydrophobic silica be thermally treated together with part or all of the organopolysiloxane (A).

The silica component (B-2) used in the second curable composition of the present invention, as described in detail below, is the hydrophobic silica thermally treated together with part or all of the organopolysiloxane (A).

As aforementioned, there are various silicas, for example, hydrophilic silicas such as wet process silica and dry process silica as well as hydrophobic silica. Of these silicas, the wet process silica as a member of the hydrophilic silicas generally exhibits an adsorbed water content (also referred to simply as "water content") of about 4 to 8%, a bulk density of 200 to 300 g/lit., a primary particle diameter of 10 to 30 m$\mu$, a specific surface area (in terms of BET) of at least 10 m$^2$/g, preferably about 50 to 800 m$^2$/g, and still preferably 100 to 300 m$^2$/g.

The water content of the dry process silica (fumed silica) is generally 1.5% or less. The dry process silica, although its initial water content, for example, immediately after the production thereof, is as low as, for example, 0.3% or less, slowly absorbs moisture while being allowed to stand still with the result that the water content is increased to, for example, about 0.5 to 1.0% after the passage of several months after the production thereof. The bulk density of the dry process silica, although varied depending on the type thereof and cannot be indiscriminately specified, is, for example, in the range of 50 to 100 g/lit. The primary particle diameter thereof is in the range of 8 to 20 m$\mu$, and the specific surface area (in terms of BET) can be at least 10 m$^2$/g, preferably about 100 to 400 m$^2$/g, and still preferably 180 to 300 m$^2$/g.

The hydrophobic silica is obtained by treating the surface of the above hydrophilic silica with an organosilicon compound such as methyltrichlorosilane, dimethyldichlorosilane, hexamethyldisilazane, hexamethylcyclotrisiloxane or octamethylcyclotetrasiloxane. In particular, the hydrophobic fumed silica obtained by treating the surface of the dry process silica with an organosilicon compound is preferred. With respect to the hydrophobic fumed silica, the moisture absorption while the silica is allowed to stand still is slight, and the water content is generally 0.3% or less, often in the range of 0.1 to 0.2%. The specific surface area thereof can be at least 10 m$^2$/g, preferably 100 to 300 m$^2$/g, and still preferably 120 to 230 m$^2$/g. The primary particle diameter thereof is in the range of 5 to 50 m$\mu$, and the bulk density is in the range of 50 to 100 g/lit.

With respect to the hydrophobic fumed silica thermally treated together with the component (A) (thermally treated hydrophobic fumed silica), the water adsorbed on the surface of the hydrophobic silica is reduced or removed physically, and the water content is generally 0.2% or less, preferably 0.1% or less, and still preferably in the range of 0.05 to 0.1%. The bulk density and other properties are similar to those of the above hydrophobic silica.

It is preferred that the above silica component (B-1) or (B-2) be contained in the curable composition of the present invention generally in an amount of 1 to 100 parts by weight, especially 2 to 50 parts by weight, and still especially 5 to 30 parts by weight, per 100 parts by weight of the component (A).

Loading the curable composition with the above amount of silica component (B-1) or (B-2) preferably enables producing a coating film of high strength and high hardness and enables providing a composition which exhibits such good thixotropy and has such an appropriate viscosity that desirable coating, especially spray coating, can be effected. For example, a thick coating film can preferably be formed on the surface of even a vertically erected base material or the like by one-time application.

In the first curable composition of the present invention, it is preferred that the hydrophobic silica (a), such as the above hydrophobic fumed silica, and the hydrophilic silica (b), such as silica with untreated surface, be used as the silica component (B-1) at a weight ratio ((a)/(b)) of 1/99 to 99/1, especially 20/80 to 80/20, and still especially 30/70 to 70/30.

When the hydrophobic fumed silica (a) is employed in combination with the hydrophilic silica (b) at the above weight ratio, the obtained curable composition is excellent in the paint stability during the preparation, safekeeping and storage, and has satisfactory thixotropy. The coating film obtained by curing the composition tends to have high strength and high hardness.

Organosilane or Partial Hydrolyzate Thereof (C)

In the present invention, when the component (A) is represented by the formula [$\alpha$], and when, in the formula [$\alpha$], W represents a hydroxyl group and a is 2, it is preferred that, in addition to the component (A) and component (B-1) or (B-2), the curable composition contain (C) an organosilane represented by the formula: $R^1{}_b SiX_{4-b}$ [I] (wherein $R^1$ represents an unsubstituted or substituted monovalent hydrocarbon group, like that represented by R and $R^1$ of the formula [$\alpha$], having 1 to 8 carbon atoms; X represents a hydrolyzable group, like that represented by W of the formula [$\alpha$]; and b is 0 or 1), or a partial hydrolyzate of the organosilane.

Specifically, in the present invention, when an organopolysiloxane having hydroxyl groups (—OH) at both molecular terminals (terminals of chain molecule or molecular chain) thereof, for example, a curable organopolysiloxane having both molecular chain terminals thereof blocked with silanol groups (≡Si—OH) is used as the component (A), it is especially preferred that the component (A) be used in combination with the component (C) as a crosslinking agent/curable agent. Further, when, for example, a curable organopolysiloxane having both molecular terminals thereof blocked with hydrolyzable groups is used as the component (A), it is also preferred that the composition, although satisfactorily curable in the absence of the component (C) as a curable agent, contain the component (C).

The above X represents the same hydrolyzable group as represented by W of the formula [α].

The organosilane represented by the formula [I] or (partial) hydrolyzate thereof can be, for example, any of methyltrimethoxysilane, methyltri(methylethylketoxime) silane, methyltripropenyloxysilane and methyltriacetoxysilane, any of silane compounds obtained by substituting, for example, vinyl, phenyl or trifluoropropyl for methyl of the above silane compounds, and partial hydrolyzates thereof. With respect to these compounds, the hydrolyzable group is preferably a ketoxime group.

Each of these organosilanes or hydrolyzates thereof (C), although can be contained in an amount of 1 to 60 parts by weight, are generally preferably contained in the curable composition of the present invention in an amount of 1 to 20 parts by weight, still preferably 2 to 10 parts by weight per 100 parts by weight of the organopolysiloxane (A).

When these organosilanes or hydrolyzates thereof (C) are contained in the curable composition in the above amount, crosslinking reaction of the component (A) is appropriately advanced, and the obtained coating film tends to have appropriate hardness, ensuring economic advantages.

Silicone Oil (D)

The curable composition of the present invention may contain silicone oil (D). Although the silicone oil (D) is not particularly limited as long as it is a nonreactive (noncondensable) silicone oil or a silicone oil which bleeds out from a cured product of the curable composition, it is preferred that use be made of silicone oil (D) different from the component (A), silicone oils represented by the following formulae [II] and [IV] and silicone oils having groups represented by the following formula [III].

Among these silicone oils (D), the silicone oils of the formulae [II] and [IV] would not be reactive with, for example, the component (A), would not be self-condensable and would have the function of forming an antifouling layer (film) at the surface (surface layer) of the coating film. On the other hand, the silicone oils with groups [III] would react with, for example, the component (A) constituting a coating film forming component to thereby form a cured coating film, would be hydrolyzed with the passage of time while being immersed in sea water for a prolonged period of time so that the terminal groups are converted into groups having an alcoholic hydroxyl group such as [≡SiR$^4$OH], and thus would bleed out from the surface of the coating film to thereby exert an effect of preventing the sticking of sea lives.

$$(R^2)_3SiO(SiR^3{}_2O)_nSi(R^2)_3 \quad \text{Formula [II]:}$$

wherein the groups R$^2$ may be identical with or different from each other, and each thereof represents a 1 to 10 carbon atoms having alkyl, aryl, aralkyl or fluoroalkyl; the groups R$^3$ may be identical with or different from each other, and each thereof represents a 1 to 10 carbon atoms having alkyl, aryl, aralkyl or fluoroalkyl; and n is a number of 0 to 150.

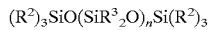

Formula [III]:

wherein R$^4$ represents an unsubstituted or substituted divalent hydrocarbon group or a divalent hydrocarbon group containing an ether bond; R$^5$ represents an unsubstituted or substituted monovalent hydrocarbon group; Y represents a hydrolyzable group; and b is 0, 1 or 2.

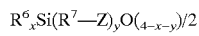

Formula [IV]:

wherein R$^6$ represents a hydrogen atom or any of an alkyl group, an aryl group and an aralkyl group, these groups each having 1 to 10 carbon atoms; R$^7$ represents an ether group, an ester group or a divalent aliphatic hydrocarbon group having 1 to 10 carbon atoms between which —NH— may be present; Z represents a monovalent polar group selected from among an amino group, a carboxyl group, an epoxy group and a polyethylene glycol or polypropylene glycol group whose terminal may be blocked with a 1 to 6 carbon atoms having alkyl or acyl; and x and y satisfy the relationships: $0.01 \leq x < 3.99$, $0.02 \leq y < 4$ and $0.02 \leq x+y < 4$.

Among the silicone oils (D), the silicone oils of the formula [II] may be those described in Japanese Patent Laid-open Publication No. 10(1998)-316933. It is preferred that the number average molecular weight thereof range from 180 to 20,000, especially from 1000 to 10,000, and that the viscosity thereof range from 20 to 30,000 centistokes, especially from 50 to 3,000 centistokes.

Examples of the silicone oils of the formula [II] include dimethylsilicone oils as represented by the formula [II] wherein all the groups R$^2$ and R$^3$ are methyl, and methylphenylsilicone oils corresponding to the dimethylsilicone oil whose methyl groups are partially replaced by phenyl. Methylphenylsilicone oils are preferred.

The above methylphenylsilicone oils are commercially available by the tradename of, for example, "KF-54", "KF-56" and "KF-50" (products of Shin-Etsu Chemical Co., Ltd.), "SH510" and "SH550" (products of Dow Corning Toray Silicone Co., Ltd.) or "TSF431" and "TSF433" (products of Toshiba Silicone Co., Ltd.).

Those described in Japanese Patent No. 2,522,854 granted on the invention formerly proposed by the same applicants can be used as the silicone oils having groups represented by the above formula [III] (simply referred to as "silicone oils [III]"). It is preferred that the number average molecular weight thereof range from 250 to 20,000, especially from 1000 to 10,000, and that the viscosity thereof range from 20 to 30,000 centistokes, especially from 50 to 3000 centistokes.

Formula [III]:

wherein R$^4$ represents an unsubstituted or substituted divalent hydrocarbon group or a divalent hydrocarbon group containing an ether bond; R$^5$ represents an unsubstituted or substituted monovalent hydrocarbon group; Y represents a hydrolyzable group; and b is 0, 1 or 2.

The group R$^4$ is, for example, an unsubstituted or substituted divalent hydrocarbon group such as methylene, ethylene, propylene, butylene or hexamethylene, or a divalent hydrocarbon group containing an ether bond as represented by the formula —(CH$_2$)$_p$—O—(CH$_2$)$_q$— (wherein each of p and q independently is an integer of 1 to 6).

The group R$^5$ is, for example, the same unsubstituted or substituted monovalent hydrocarbon group having 1 to 8 carbon atoms as represented by R$^1$ of the formula [I] for the above component (C). The group Y is, for example, the same hydrolyzable group as represented by X of the formula [I] for the above component (C).

The silicone oils [III], i.e., silicone oils having at least one group represented by the formula [III] can be, for example, silicone oils having hydroxyls thereof blocked with hydrolyzable groups, represented by the formulae:

(CH$_3$)$_3$SiO[(CH$_3$)$_2$SiO]$_m$[R$^7$R$^8$SiO]$_n$(CH$_3$)$_2$SiC$_3$H$_6$—OH,

HO—C$_3$H$_6$—[(CH$_3$)$_2$SiO][(CH$_3$)$_2$SiO]$_m$[R$^7$R$^8$SiO]$_n$—(CH$_3$)$_2$Si—C$_3$H$_6$—OH, and

(CH$_3$)$_3$SiO[(CH$_3$)$_2$SiO]$_m$[R$^7$R$^8$SiO]$_n$[(CH$_3$)(C$_3$H$_6$—OH)SiO]$_1$[(CH$_3$)$_2$SiCH$_3$], as described in the above Japanese Patent No. 2,522,854. In the above formulae, R$^7$ and R$^8$ represent unsubstituted or substituted monovalent hydrocarbon groups selected from among aryl groups such as phenyl and tolyl, aralkyl groups such as benzyl and β-phenylethyl, and halogenated alkyl groups such as trifluoropropyl, provided that at least one of R$^7$ and R$^8$ is not methyl; and m, n and 1 are all integers.

Further, from the viewpoint of the storage stability of the final composition, the silicone oils [III] can be those obtained by reacting the above silicone oils with organosilanes represented by the formula: R$^5{}_b$SiY$_{3-b}$ (wherein R$^5$, Y and b are as defined in the formula [III]), for example, as follows:

(CH$_3$)$_3$SiO[(CH$_3$)$_2$SiO]$_m$[R$^7$R$^8$SiO]$_n$(CH$_3$)$_2$SiC$_3$H$_6$—O—R$^5{}_b$SiY$_{3-b}$,

HO—C$_3$H$_6$—[(CH$_3$)$_2$SiO][(CH$_3$)$_2$SiO]$_m$[R$^7$R$^8$SiO]$_n$—(CH$_3$)$_2$Si—C$_3$H$_6$—O—R$^5{}_b$SiY$_{3-b}$, and

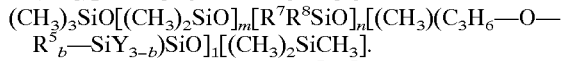
(CH$_3$)$_3$SiO[(CH$_3$)$_2$SiO]$_m$[R$^7$R$^8$SiO]$_n$[(CH$_3$)(C$_3$H$_6$—O—R$^5{}_b$—SiY$_{3-b}$)SiO]$_1$[(CH$_3$)$_2$SiCH$_3$].

The silicone oils of the formula [IV] can be, for example, those described in Japanese Patent Laid-open Publication No. 10(1998)-316933. It is preferred that the number average molecular weight thereof range from 250 to 30,000, especially from 1000 to 20,000, and that the viscosity thereof range from 20 to 30,000 centistokes, especially from 50 to 3,000 centistokes.

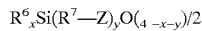

$$R^6{}_xSi(R^7\text{—}Z)_yO_{(4-x-y)/2} \quad \text{Formula [IV]}$$

wherein R$^6$ represents a hydrogen atom or any of an alkyl group, an aryl group and an aralkyl group, these groups each having 1 to 10 carbon atoms; R$^7$ represents an ether group, an ester group or a divalent aliphatic hydrocarbon group having 1 to 10 carbon atoms between which —NH— may be present; Z represents a monovalent polar group selected from among an amino group, a carboxyl group, an epoxy group and a polyethylene glycol or polypropylene glycol group whose terminal may be blocked with a 1 to 6 carbon atoms having alkyl or acyl; and x and y satisfy the relationships: $0.01 \leq x < 3.99$, $0.02 \leq y < 4$ and $0.02 \leq x+y<4$.

The silicone oils of the formula [IV] are preferably those represented by the formula [IV] wherein R$^6$ represents methyl or phenyl and R$^7$ represents methylene, ethylene or propylene. When Z represents a polyethylene glycol or polypropylene glycol group whose terminal may be blocked with an up to 6 carbon atoms having alkyl or acyl, the number of oxyethylene units or oxypropylene units as repeating units in the group preferably ranges from 10 to 60. The above alkyl for terminal blocking can be, for example, any of methyl, ethyl, propyl and butyl, and the above acyl for terminal blocking can be, for example, any of ketoxime, acetyl and propionyl.

Examples of the silicone oils of the formula [IV] wherein the polar group Z is an amino group include "SF8417" (produced by Dow Corning Toray Silicone Co., Ltd.), "ISI4700" and "ISI4701" (produced by Toshiba Silicone Co., Ltd.) and "FZ3712" and "AFL-40" (produced by Nippon Unicar Company, Limited). Examples of the silicone oils of the formula [IV] wherein the polar group Z is a carboxyl group include "XI42-411" (produced by Toshiba Silicone Co., Ltd.), "SF8418" (produced by Dow Corning Toray Silicone Co., Ltd.), and "FXZ4707" (produced by Nippon Unicar Company, Limited). Examples of the silicone oils of the formula [IV] wherein the polar group Z is an epoxy group include "SF8411" (produced by Dow Corning Toray Silicone Co., Ltd.), "XI42-301" (produced by Toshiba Silicone Co., Ltd.) and "L-93" and "T-29" (produced by Nippon Unicar Company, Limited). Examples of the silicone oils of the formula [IV] wherein the polar group Z is an alkyl or acyl include "ISI4460", "ISI4445" and "ISI4446" (produced by Toshiba Silicone Co., Ltd.), "SH3746", "SH8400", "SH3749" and "SH3700" (produced by Dow Corning Toray Silicone Co., Ltd.), and "KF6009" (produced by Shin-Etsu Silicone Co., Ltd.).

In the present invention, the silicone oil (D), preferably at least one of the silicone oil [II], silicone oil [III] and silicone oil [IV], is preferably contained in the composition in a total amount of 0.1 to 200 parts by weight, still preferably 20 to 100 parts by weight, per 100 parts by weight of the component (A).

When the amount of the silicone oil (D) falls within the above range, there is a tendency to form, for example, in the use as an antifouling paint, an (antifouling) coating film being excellent in both of antifouling properties and coating film strength. When the amount of the silicone oil (D) is less than the above range, the antifouling properties may be deteriorated. On the other hand, when the amount of the silicone oil (D) exceeds the above range, the strength of the coating film may be reduced.

Production of Curable Composition

The first curable composition of the present invention, especially the coating composition, curable paint composition or antifouling paint composition, can be produced by first heating part or all of the component (A) together with at least the hydrophilic silica, preferably both of the hydrophilic silica and the hydrophobic silica, among the components (B-1) under the atmospheric pressure or a reduced pressure at a temperature which is 100° C. or over but below the decomposition temperatures of the components, preferably from 100 to 300° C., and still preferably about 140 to 200° C., for a period generally from 30 min to 3 hr, and thereafter adding thereto any remainder of the component (A) and any remainder of the component (B-1) optionally together with the component (C) and the component (D). The second curable composition of the present invention can be produced by first heating part or all of the component (A) together with the hydrophobic silica as the silica component (B-2) under the same pressure at the same temperature for the same period as effected in the production of the first curable composition, and thereafter adding thereto any remainder of the component (A) optionally together with the component (C) and the component (D).

The heating of at least the hydrophilic silica, preferably both of the hydrophilic silica and the hydrophobic silica, among the components (B-1) together with the component (A) in the first invention and the heating of the hydrophobic silica as the component (B-2) together with the component (A) in the second invention enable avoiding aggregation of the component (B-1) or (B-2) as a filler component because of the high affinity between the component (A) and the filler component in the obtained composition. Therefore, the final coating composition, for example, the antifouling paint composition has appropriate fluidity and thixotropy to thereby enable forming a coating film of desirably large thickness even on a vertical surface by one-time or a few applications thereof.

In the agitation and mixing of the above added components, appropriate use is made of common mixers and agitators such as Ross mixer, planetary mixer and universal Shinagawa agitator.

For example, catalysts described in Japanese Patent No. 2,522,854 can appropriately be used as the above catalyst of the present invention, examples of which include:

tin carboxylates such as tin naphthenate and tin oleate;

tin compounds such as dibutyltin diacetate, dibutyltin dioctoate, dibutyltin dilaurate, dibutyltin dioleate, dibutyltin oxide, dibutyltin dimethoxide and dibutylbis(triethoxysiloxy)tin;

titanates and titanium chelate compounds such as tetraisopropoxytitanium, tetra-n-butoxytitanium, tetrakis(2-ethylhexoxy)titanium, dipropoxybis(acetylacetonato)titanium and titanium isopropoxyoctyl glycol;

organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate and alkoxyaluminum compounds;

alkoxysilanes substituted with aminoalkyl groups such as 3-aminopropyltrimethoxysilane, N-β-aminoethyl-γ-aminopropyltrimethoxysilane;

amine compounds and salts thereof such as hexylamine, dodecyldodecylamine phosphate, dimethylhydroxylamine and diethylhydroxylamine;

quaternary ammonium salts such as benzyltriethylammonium acetate;

lower fatty acid salts of alkali metals such as potassium acetate, sodium acetate and lithium oxalate; and guanidino containing silanes and siloxanes such as tetramethylguanidinopropyltrimethoxysilane, tetramethylguanidinopropylmethyldimethoxysilane and tetramethylguanidinopropyltris(trimethylsiloxy)silane.

These catalysts are used in an amount of not greater than 10 parts by weight, preferably not greater than 5 parts by weight, and still preferably not greater than 1 parts by weight, per 100 parts by weight of the component (A). The preferred lower limit of these catalysts is 0.001 part by weight, especially 0.01 part by weight.

<Optional Component>

The curable composition of the present invention, when used as, for example, a coating composition, especially a paint composition or an antifouling paint composition, still especially a curable antifouling paint composition (antifouling paint), may be optionally loaded with the below described antifouling agents, plasticizers, inorganic dehydrating agents (stabilizers), metal salts of carboxylic acids, antisagging/antisetting agents (thixotropic agents), pigments, other coating film forming components, other fillers, fire retardants, thixotropic agents, heat conduction improvers, solvents, mildewproofing agents, germicides, flatting agents, perfumes and the like, in addition to the above essential components (A) and (B-1) or (B-2) and optional components (C) and (D).

<Antifouling Agents>

Both inorganic and organic antifouling agents can be used. Although common inorganic antifouling agents can be used, copper and inorganic copper compounds are especially preferred.

Organic Antifouling Agents

Examples of the organic antifouling agents include metal-pyrithione compounds of the formula:

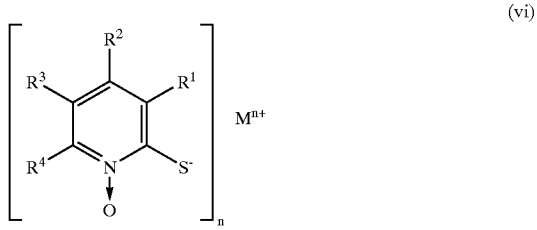

(vi)

wherein each of $R^1$ to $R^4$ independently represents a hydrogen atom, an alkyl group, an alkoxy group or a halogenated alkyl group; M represents a metal such as Cu, Zn, Na, Mg, Ca, Ba, Pb, Fe or Al; and n is a valence, and further include tetramethylthiuram disulfide, carbamate compounds (e.g., zinc dimethyldithiocarbamate and manganese 2-ethylenebisdithiocarbamate), 2,4,5,6-tetrachloroisophthalonitrile, N,N-dimethyldichlorophenylurea, 4,5-dichloro-2-n-octyl-3 (2H)isothiazoline, 2,4,6-trichlorophenylmaleimide and 2-methylthio-4-t-butylamino-6-cyclopropyl-s-triazine.

Of the above organic antifouling agents, copper pyrithione (in the formula (vi), M=Cu), zinc pyrithione (in the formula (vi), M=Zn), N,N-dimethyldichlorophenylurea, 2,4,6-trichlorophenylmaleimide, 2-methylthio-4-t-butylamino-6-cyclopropyl-s-triazine, 4,5-dichloro-2-n-octyl-4-isothiazolin-3-one and 2,4,5,6-tetrachloroisophthalonitrile are preferred.

Of these organic antifouling agents, metal pyrithiones and/or 4,5-dichloro-2-n-octyl-4-isothiazolin-3-one is still preferred, the joint use thereof yet still preferred because excellent antifouling capability can be exhibited. In particular, the use of copper pyrithione and/or 4,5-dichloro-2-n-octyl-4-isothiazolin-3-one is especially preferred, the joint use thereof yet especially preferred.

In the antifouling paint compositions containing these organic antifouling agents, for example, it is generally preferred that, besides the copper and/or inorganic copper compounds, the organic antifouling agent be contained in an amount of 0.1 to 20% by weight, especially 0.5 to 10% by weight. Per 100 parts by weight of solid contents of the paint composition, it is generally preferred that the organic antifouling agent in terms of solid be contained in an amount of 0.1 to 150 parts by weight, especially 0.1 to 100 parts by weight.

<Plasticizer (Chlorinated Paraffin)>

Examples of the plasticizers include TCP (tricresyl phosphate), chlorinated paraffin and polyvinyl ethyl ether. These plasticizers can be used either individually or in combination.

These plasticizers contribute to enhancement of the crack resistance of the coating film composed of obtained antifouling paint composition (also referred to as "antifouling coating film").

<Inorganic Dehydrating Agent>

The inorganic dehydrating agents also function as a stabilizer to thereby enable enhancing the storage stability of the final antifouling paint composition. Examples of the inorganic dehydrating agents include anhydrous gypsum ($CaSO_4$), synthetic zeolite adsorbents (trade name: Molecular Sieve, etc.) and silicates, of which anhydrous gypsum and Molecular Sieve are preferably employed. These inorganic dehydrating agents can be used either individually or in combination.

With respect to the curable paint compositions containing these inorganic dehydrating agents, the inorganic dehydrating agent may generally be contained in the nonstannous paint composition of the present invention in an amount of 0.1 to 10% by weight, preferably about 0.1 to 5% by weight.

<Metal Salt of Carboxylic Acid>

The curable paint composition of the present invention may further contain metal salts of carboxylic acids.

Use is made of carboxylic acid metal salts whose molecular weight is generally in the range of 50 to 1000, preferably 100 to 600.

Carboxylic acids constituting these carboxylic acid metal salts can be, for example, carboxylic acids with an alicyclic structure (e.g., naphthenic acid), carboxylic acids with an aromatic ring structure (e.g., α-(2-carboxyphenoxy)stearic acid), rosin resin acids and fatty acids. Of these, naphthenic acid, rosin resin acids and fatty acids are preferred.

<Antisagging/antisetting Agent (Thixotropic Agent)>

Examples of the antisagging/antisetting agents (thixotropic agents) include organic clay salts such as stearate, lecithinate, alkylsulfonate salts of Al, Ca and Zn, and further include polyethylene wax, amide wax, hydrogenated castor oil wax, polyamide wax, a mixture of hydrogenated castor oil wax and polyamide wax, synthetic particulate silica and polyethylene oxide wax. Of these, polyamide wax, synthetic particulate silica, polyethylene oxide wax and organic clay salts are preferably employed. As the antisagging/antisetting agents, use can also be made of those commercially available, for example, by the trade names "Disparlon 305", "Disparlon 4200-20" and "Disparlon A632-20X", all products of Kusumoto Chemicals, Ltd.

These antisagging/antisetting agents are added to the curable paint composition in an amount of, for example, 0.1 to 10% by weight.

<Pigment>

Use can be made of various common organic and inorganic pigments.

Examples of the organic pigments include carbon black, Phthalocyanine Blue and Prussian Blue. Examples of the inorganic pigments include those which are neutral and nonreactive, such as titanium white, red iron oxide, baryta powder, silica, calcium carbonate, talc, whiting (chalk) and iron oxide powder; and those (active pigments) which are basic and react with acidic substances in the paint, such as zinc oxide (ZnO), white lead, red lead, zinc powder and lead suboxide powder. Dyes and other various colorants may be contained in the pigments. These various pigments are added to the curable composition, especially the curable paint composition, in a total amount of, for example, about 0.5 to 45% by weight.

<Other Coating Film Forming Component>

Coating film forming components other than the above organopolysiloxane (A), etc. may be contained in the curable composition as long as it is not detrimental to the object of the present invention. Examples of the other coating film forming components include slightly water-soluble or non-water-soluble resins (hereinafter also referred to as "slightly/non-water-soluble resins") such as acrylic resin, acrylic silicone resin, unsaturated polyester resins, fluororesins, polybutene resin, silicone rubber, urethane resin (rubber), polyamide resins, vinyl chloride copolymer resins, chlorinated rubber (resin), chlorinated olefin resins, styrene/butadiene copolymer resin, ethylene/vinyl acetate copolymer resin, vinyl chloride resin, alkyd resin, cumarone resin, trialkylsilyl acrylate (co)polymers (silyl resins) and petroleum resin.

<Other Filler, Fire Retardant, Thixotropic Agent, Heat Conduction Improver and Adhesive Component>

Examples of the other fillers than mentioned above include:

metal oxides such as diatom earth, iron oxide, zinc oxide, titanium oxide and alumina, and substances obtained by treating the surface of these with silane compounds;

metal carbonates such as calcium carbonate, magnesium carbonate and zinc carbonate; and other materials such as asbestos, glass fiber, carbon black, quartz powder, aluminum hydroxide, gold powder, silver powder, calcium carbonate with its surface treated and glass balloon. These fillers may be used either individually or in combination.

Examples of the thixotropic agents include polyethylene glycol, polypropylene glycol and derivatives thereof.

Examples of the fire retardants include antimony oxide and paraffin oxide.

Examples of the heat conduction improvers include boron nitride and aluminum oxide.

Examples of the adhesive components include silane coupling agents having at least one alkoxysilyl group, epoxy group, hydrosilyl group, (meth)acrylic group, hydroxysilyl group or like group, like substances and mixtures thereof.

<Solvent>

Although solvents may be contained or absent in the curable composition such as the curable paint composition according to the present invention, the above various components can be dissolved or dispersed in solvents before use according to necessity. Use can be made of various solvents commonly added to antifouling paints, such as aliphatic, aromatic, ketonic, ester, ether and alcoholic solvents. Examples of the aromatic solvents include xylene and toluene. Examples of the ketonic solvents include MIBK and cyclohexanone. Examples of the ether solvents include propylene glycol monomethyl ether and propylene glycol monomethyl ether acetate (PMAC). Examples of the alcoholic solvents include isopropyl alcohol.

These solvents, although can be used in an arbitrary amount, are, for example, added to the curable composition in an amount of 0.1 to 9999 parts by weight, preferably 1 to 50 parts by weight, per 100 parts by weight of the component (A). The solvents are used in such an amount that the proportion thereof to the curable composition of the present invention is in the range of 1 to 99% by weight, preferably 5 to 50% by weight.

The viscosity (25° C., Brookfield viscometer, rotor No. 3) of the curable composition such as the curable paint composition optionally diluted with the above solvents, taking into account the applicability (sagging properties) and the thickness of coating film obtained by one-time application, is, for example, in the range of about 0.01 to 500 P(poise)/25° C., preferably 0.1 to 200 P/25° C., that is, in the range of about 0.001 to 50 Pa·s, preferably 0.01 to 20 Pa·s.

The curable composition of the present invention is suitable for use as a coating material (coating composition) applied to various base materials such as an electrical part, an electronic part, a building material, a craftwork object, a fashion industry supply and a medical supply in order to cover the surface thereof. Further, the curable composition is suitable for use as an antifouling paint applied to base materials brought into contact with sea water or fresh water, such as an underwater structure, a ship shell plate, a fishing net and a fishing gear, in order to render the surface thereof antifouling. Still further, the curable composition is used as a de-icing paint, a water repellent or the like. Thus, the curable composition of the present invention finds applicability in a wide range of industrial fields such as electricity/ electronics, building material/craftwork, apparel industry, medical treatment, agriculture/forestry/fishery, electric power production, harbor/civil engineering construction, shipbuilding, ship repair (especially ship painting), etc.

In particular, in the application and curing the above curable composition as a coating composition to the surface of base materials such as an electrical part, an electronic part, a building material, a craftwork object, an apparel industry supply and a medical supply, the curable composition exhibits an excellent balance of low viscosity and high thixotropy to thereby enable forming a thick coating film by one-time application. Thus, the curable composition ensures high coating operation efficiency. The application and curing the curable composition provides base materials covered with coating films which are excellent in, for example, fire retardation, rubber strength and surface smoothness.

Also, in particular, the above curable composition can be applied as a paint, especially an antifouling paint (antifouling paint composition), to the surface of various shaped items such as underwater structures, for example, supply water inlets and waste water outlets for thermal power plants and nuclear power plants, sea water utilizing apparatus (e.g., sea water pump), megafloats, coastal roads, undersea tunnels, harbor facilities, sludge diffusion preventive membranes for use in various marine civil engineering works such as canals and waterways, ships (especially ship shell plates) and fishing materials (e.g., rope, fishing net, float and buoy) once or a plurality of times according to the customary technique and cured. As a result, there can be obtained antifouling base materials, such as ships and underwater structures, covered with the antifouling coating film which is excellent in antifouling properties and can slowly release the antifouling agent component for a prolonged period of time and which, despite the thick coating, has appropriate flexibility with excellent crack resistance. In the application of the curable composition, use is made of a wide variety of common coating techniques such as brush, roll, spray and dip coater.

The antifouling coating film obtained by applying the above curable antifouling paint composition of the present invention to the surface of various shaped items (base materials) and curing the same is excellent in antifouling properties and, for example, can continuously inhibit sticking of aquatic organisms such as sea lettuces, barnacles, green lavers, serpulas, oysters and Bugula for a prolonged period of time.

When, for example, the supply water inlets and waste water outlets for nuclear power plants, megafloats and ships are made of FRP, steel, wood, aluminum alloy and the like, the curable antifouling paint composition particularly effectively adheres to the surface of these base materials. This curable antifouling paint composition may be applied as an overcoat to the surface of any existing antifouling coating films.

Moreover, for example, the application and curing the curable antifouling paint composition to the surface of undersea structures enables inhibiting the sticking of sea lives so that the capability of the undersea structures can be maintained for a prolonged period of time. The application and curing the curable antifouling paint composition to the surface of fishing nets enables avoiding the clogging of the meshes of the fishing nets while ensuring a reduced danger of environmental pollution.

The curable antifouling paint composition of the present invention may be directly applied to fishing nets, or may be applied to the surface of ships, underwater structures and the like which has been furnished with an undercoat such as a rust preventive agent or a primer. Furthermore, the curable antifouling paint composition of the present invention may be applied as an overcoat for repair to the surface of ships, especially FRP ships, underwater structures and the like which has already been coated with conventional antifouling paints or the curable antifouling paint composition of the present invention. The thickness of the antifouling coating film thus formed on the surface of the ships, underwater structures and the like, although not particularly limited, is, for example, in the range of about 30 to 150 $\mu$m per application.

The thus obtained antifouling coating film, or coating film on the surface of parts of ships and underwater structures brought into contact with water, according to the present invention is formed from the above curable antifouling paint composition, ensures a reduced danger of environmental pollution and is excellent in the long-term antifouling capability against a wide variety of organisms which adhere to ships and underwater structures.

EFFECT OF THE INVENTION

The curable composition of the present invention, when used as a coating composition, especially a paint, an antifouling paint composition or the like, realizes an excellent balance of low viscosity and high thixotropy and exhibits excellent sprayability, for example, free from nozzle clogging and turbulence. The curable composition enables forming a thick coating film by one-time application to thereby enable shortening the operating period for coating. A coating film or other cured product, which is excellent in the uniformity of coating film surface (uniformity of coating film thickness and surface smoothness), can be obtained by the application thereof. Moreover, the obtained coating film is also excellent in film strength (rubber strength) and film hardness. In the use as an antifouling paint, the obtained coating film can exert excellent antifouling capability for a prolonged period of time. Furthermore, the curable composition ensures excellent storage stability before application thereof. Thus, there is provided the coating composition, especially curable composition which is suitable for use as a curable paint composition, an antifouling paint composition or the like.

Further, according to the present invention, there are provided not only the coating film, coating composition cured product and other various cured products (especially antifouling coating film), which, as mentioned above, are excellent in film strength and film hardness and which exert excellent antifouling capability for a prolonged period of time but also, for example, the underwater structure and ship shell plate covered with the coating film to thereby possess these characteristics.

Still further, according to the present invention, there are provided the method of forming a coating film on the surface of a base material such as an electronic part and the method of rendering antifouling the surface of a base material such as an underwater structure, wherein, for example, the above coating film with excellent properties can efficiently formed on the surface of various base materials such as an underwater structure in a manner ensuring worker's safety and free from the danger of environmental pollution.

EXAMPLE

The present invention will further be illustrated below with reference to the following Examples and Comparative Examples, which in no way limit the scope of the invention.

In the following Synthetic Examples, Working Examples and Comparative Examples, compositions are described in terms of parts by weight unless otherwise specified.

Synthesis of Silicone Oil (D)

Synthetic Example 1

193 g of organopolysiloxane having an alcoholic hydroxyl group, represented by the formula:

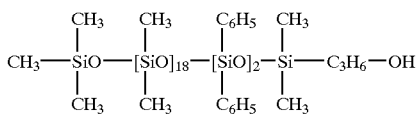

was mixed with 60 g of methyltri(methylethylketoxime) silane at room temperature and reacted, thereby obtaining silicone oil (D) of the formula:

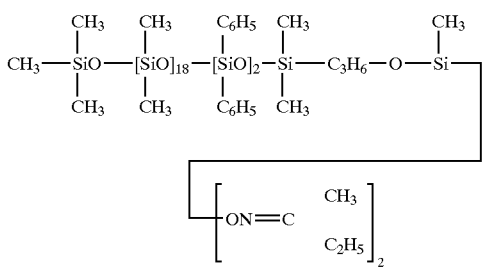

This silicone oil contained unreacted starting compound methyltri(methylethylketoxime)silane.

[Preparation of Organopolysiloxane Paint Compositions (1A) to (1F) specified in Table 1]

Component (refer to *2) obtained by subjecting dimethylpolysiloxane having both molecular terminals thereof blocked with silanol groups whose viscosity was 20,000 cSt, as organopolysiloxane, and hydrophobic fumed silica having its surface treated with hexamethyldisilazane to mixing and agitation at 150° C. for 2 hr to thereby effect thermal treatment, component (refer to *3) obtained by subjecting the hydrophobic silica indicated in Table 1 and the organopolysiloxane to mixing and agitation at room temperature and component (refer to *4) obtained by subjecting the hydrophilic silica indicated in Table 1 and the organopolysiloxane to mixing and agitation 150° C. for 2 hr to thereby effect thermal treatment were blended together in proportions indicated in Table 1, and satisfactorily mixed by means of an agitator so that homogeneous dispersions were obtained. Further, the crosslinking agent and catalyst were added in proportions indicated in Table 1 and homogeneously mixed. Thus, room-temperature-curable organopolysiloxane paint compositions of formulations (1A) to (1F) were obtained.

The property values of these compositions are listed in Table 1. In Table 1, *1, *2, *3 and *4 have the following meanings, and the testing methods are as described below.

Further, in the table, the amount of various silicas is expressed by parts by weight per 100 parts by weight of organopolysiloxane (A).

*1: Organopolysiloxane: produced by Shin-Etsu Chemical Co., Ltd.
  represented by the formula: $HO(CH_3)_2SiO)_mH$ (viscosity at 25° C.: 20,000 cSt).

*2: Thermally treated hydrophobic fumed silica:
  silica obtained by subjecting the hydrophobic fumed silica indicated in Table 1 and the above organopolysiloxane to mixing and agitation 150° C. for 2 hr to thereby effect thermal treatment (produced by Shin-Etsu Chemical Co., Ltd., water content of silica: 0.05%, bulk density: 50 g/lit., primary particle diameter: 10 m$\mu$, and specific surface area (in terms of BET): 180 m$^2$/g).

*3: Room-temperature-treated hydrophobic fumed silica:
  silica obtained by subjecting the hydrophobic fumed silica indicated in Table 1 and the above organopolysiloxane to mixing and agitation at room temperature (produced by Shin-Etsu Chemical Co., Ltd., water content: 0.2%, bulk density: 50 g/lit., primary particle diameter: 10 m$\mu$, and specific surface area (in terms of BET): 180 m$^2$/g).

*4: Thermally treated hydrophilic silica:
  silica obtained by subjecting the hydrophilic silica indicated in Table 1 and the above organopolysiloxane to mixing and agitation 150° C. for 2 hr to thereby effect thermal treatment (produced by Shin-Etsu Chemical Co., Ltd., water content: 1.0%, bulk density: 60 g/lit., primary particle diameter: 12 m$\mu$, and specific surface area (in terms of BET): 190 m$^2$/g).

[Testing Method]

(a) Viscosity

The viscosity (Pa·s/25° C.) of the obtained organopolysiloxane paint compositions as specified in Table 1 was measured by the use of Brookfield viscometer (rotor No. 3).

(b) Physical characteristics of coating film:

The physical characteristics of coating film were determined with respect to the coating films of 2 mm thickness prepared by applying each of the organopolysiloxane paint compositions (1A) to (1F) onto a stainless steel plate and allowing it to stand still at 25° C. in 55% RH for 7 days to thereby effect curing thereof.

Results are given in Table 1.

TABLE 1

| | Organopolysiloxane paint composition | | | | | |
| | Example | | | | Comp. Ex. | |
| | 1A | 1B | 1C | 1D | 1E | 1F |
|---|---|---|---|---|---|---|
| organopolysiloxane *1 | 0 | 0 | 0 | 0 | 50 | 50 |
| thermally treated hydrophobic fumed silica mixture *2 | 60 | 90 | 60 | 30 | | |
| (hydrophobic fumed silica *5) | (10) | (15) | (10) | (5) | | |
| (organopolysiloxane *6) | (50) | (75) | (50) | (25) | | |
| room temp. treated hydrophobic fumed silica mixture *3 | | | | | 70 | |
| (hydrophobic fumed silica *5) | | | | | (20) | |
| (organopolysiloxane *6) | | | | | (50) | |

TABLE 1-continued

| | Organopolysiloxane paint composition | | | | | |
|---|---|---|---|---|---|---|
| | Example | | | | Comp. Ex. | |
| | 1A | 1B | 1C | 1D | 1E | 1F |
| thermally treated hydrophilic silica mixture *4 | 60 | 30 | 60 | 90 | | 70 |
| (hydrophilic silica *5) | (10) | (5) | (10) | (15) | | (20) |
| (organopolysiloxane *6) | (50) | (25) | (50) | (75) | | (50) |
| (total organopolysiloxane (A) component in compsn.) | (100) | (100) | (100) | (100) | (100) | (100) |
| methyltri (methylethylketoxime) silane | | | 10 | 10 | 10 | 10 |
| methyltriacetoxysilane | 7 | 7 | | | | |
| dibutyltin dilaurate | 0.1 | 0.1 | 0.1 | 0.1 | 0.1 | 0.1 |
| xylene | 20 | 20 | 20 | 20 | 20 | 20 |
| properties | | | | | | |
| viscosity (Pa · s/25° C.) | 0.7 | 0.8 | 0.7 | 0.6 | 0.8 | 0.5 |
| specific gravity (20° C.) | 0.99 | 0.99 | 0.99 | 0.99 | 0.99 | 0.98 |
| physical characteristic of film | | | | | | |
| hardness (JIS-K) | 45 | 47 | 46 | 42 | 39 | 24 |
| tensile strength (MPa) | 3.5 | 3.6 | 3.5 | 3.3 | 2.9 | 2.0 |
| elongantion (%) | 230 | 210 | 230 | 250 | 170 | 190 |

*1, 2, 3, 4, 5: produced by Shin-Etsu Chemical Co., Ltd.
*1: organopolysiloxane (weight) added at the time of composition preparation.
*2, 3, 4: numeric value indicates the addition amount (weight) of silica/organopolysiloxane treatment product.
*5:) silica (weight) contained in silica/organopolysiloxane treatment product.
*6:) organopolysiloxane (weight) contained in silica/organopolysiloxane treatment product.

Examples 1 to 4 and Comparative Examples 1 and 2

Silicone oil and xylene were added in amounts indicated in Table 2 to 100 parts by weight of each of the obtained organopolysiloxane paint compositions (1A) to (1F) as specified in Table 1, and mixed and agitated until becoming homogeneous. Thus, antifouling paint compositions were obtained.

With respect to each of the antifouling paint compositions, the properties and applicability were determined.

Results are given in Table 2.

Further, an antifouling test was performed with respect to each of the antifouling paint compositions immediately after the preparation thereof.

Results are given in Table 3.

In Table 2, *7, *8, *9 and *10 have the following meanings, and the testing methods are as described below. The parenthesized amount of various silicone oils is parts by weight added per 100 parts by weight of organopolysiloxane (A).

*7 SH550: dimethylphenylsilicone oil, viscosity: 130 centistokes, produced by Dow Corning Toray Silicone Co., Ltd.
*8 TSF431: dimethylphenylsilicone oil, viscosity: 100 centistokes, produced by Toshiba Silicone Co., Ltd.
*9 KF50: dimethylphenylsilicone oil, viscosity: 100 centistokes, produced by Shin-Etsu Chemical Co., Ltd.
*10 KF6016: polyether modified silicone oil, viscosity: 150 centistokes, produced by Shin-Etsu Chemical Co., Ltd.

TABLE 2

| | | | Example 1 | Example 2 | Example 3 | Example 4 | Comp. Ex. 1 | Comp. Ex. 2 |
|---|---|---|---|---|---|---|---|---|
| organopolysiloxane (paint) compsn. | | type | 1A | 1B | 1C | 1D | 1E | 1F |
| | | amt. | 100 | 100 | 100 | 100 | 100 | 100 |
| silicone oil | SH550 *7 | | 60 (64) | | | 70 (75) | | 40 (43) |
| | TSF431 *8 | | | 80 (85) | 60 (64) | | 30 (32) | 30 (32) |
| | KF50 *9 | | | | 30 (32) | 40 (43) | | |
| | silicone oil of Synthetic Ex. 1 | | | | | | | |
| | KF-6016 | | | | | 10 (11) | | |
| xylene | | | 10 | 10 | 10 | 10 | 10 | 10 |
| properties of paint | viscosity (Pa · s/25° C.) | | 0.4 | 0.5 | 0.3 | 0.3 | 0.5 | 0.2 |
| | specific gravity (20° C.) | | 0.99 | 0.99 | 0.99 | 0.99 | 0.99 | 0.99 |
| applicability | sprayability | | good | good | good | good | good | good |
| | sagging (limit film thickness μm) | | 180 | 170 | 180 | 160 | 160 | 130 |
| after 3 | condition of paint (stability) | | normal | normal | normal | normal | gelatinized | gelatinized |

TABLE 2-continued

|  |  | Example 1 | Example 2 | Example 3 | Example 4 | Comp. Ex. 1 | Comp. Ex. 2 |
|---|---|---|---|---|---|---|---|
| months at 50° C. | sprayability | good | good | good | good | clogged | clogged |
|  | sagging (limit film thickness μm) | 180 | 170 | 180 | 160 | 140 | 110 |

*7: produced by Dow Corning Toray Silicone Co., Ltd.
*8: produced by Toshiba Silicone Co., Ltd.
*9: produced by Shin-Etsu Chemical Co., Ltd.
*10: produced by Shin-Etsu Chemical Co., Ltd.
Note: parenthesized amount of silicone oils indicates the addition amount (pts. wt.) per 100 parts by weight of organopolysiloxane (A).

TABLE 3

|  |  | Example 1 | Example 2 | Example 3 | Example 4 | Comp. Ex. 1 | Comp. Ex. 2 |
|---|---|---|---|---|---|---|---|
| antifouling property | 6 months | normal | normal | normal | normal | normal | normal |
|  | 12 months | normal | normal | normal | normal | normal | normal |
|  | 18 months | normal | normal | normal | normal | normal | slime slightly adhered |
|  | 24 months | normal | normal | normal | normal | slime/shellfish slightly adhered | slime/shellfish/sea lettuce adhered |
|  | 30 months | slime slightly adhered | slime slightly adhered | slime slightly adhered | slime slightly adhered | slime/shellfish/sea lettuce adhered | slime/shellfish/sea lettuce adhered |

[Testing Method]
(a) Paint Property
The paint properties were measured in the same manner as in Example (1A), etc.
The coating applicability and the antifouling characteristics were tested in the following manner.
(b) Coating Applicability
A soft steel plate of the size 70 mm×150 mm×1 mm thickness was bonded to the center of a tin plate of the size 1000 mm×1000 mm×1 mm thickness, and airless spray coating was carried out while holding the tin plate upright. Whether or not the spraying device was clogged was inspected, and the limit film thickness over which film sagging occurred was measured after drying of the coating film.
(c) Antifouling Test
An epoxy undercoat paint was applied in a thickness of 200 μm over a polyvinyl chloride plate of the size 100 mm×300 mm×5 mm thickness. Each of the antifouling paint compositions was applied by a brush over the epoxy coating film so that the dried antifouling film thickness became 150 μm. After the drying for 3 days, the coated plates were immersed still in the Bay of Miyazima for a period of 30 months. After the completion of the immersion, the antifouling properties were evaluated by visual observation.
(d) Evaluation of Paint Stability and Coating Applicability
With respect to each of the antifouling paint compositions, the condition of paint (stability) and coating applicability after stocking at 50° C. for 3 months following the preparation thereof were tested.
Condition of Paint (Stability)
Each of the antifouling paint compositions specified in Table 2 was placed in a can, sealed, and allowed to stand still in a 50° C. thermostat for 3 months. The can was opened, and the paint composition was agitated well, followed by inspection with the use of a fineness gauge. Results are also given in the above Tables 2 and 3.
(e) Antifouling Test
The antifouling test was performed with respect to the antifouling paint compositions having been stocked at 50° C. for 3 months after the preparation thereof.
Results are given in Table 4.

TABLE 4

|  |  | Example 1 | Example 2 | Example 3 | Example 4 | Comp. Ex. 1 | Comp. Ex. 2 |
|---|---|---|---|---|---|---|---|
| antifouling property | 6 months | normal | normal | normal | normal | slime slightly adhered | slime adhered much |
|  | 12 months | normal | normal | normal | normal | slime adhered much | slime/shellfish slightly-adhered |
|  | 18 months | normal | normal | normal | normal | slime/shellfish slightly adhered | slime/shell fish adhered much |
|  | 24 months | normal | normal | normal | normal | slime/shellfish adhered much | slime/shellfish/sea lettuce adhered |
|  | 30 months | slime slightly adhered | slime slightly adhered | slime slightly adhered | slime slightly adhered | slime/shellfish/sea lettuce adhered | slime/shellfish/sea lettuce adhered |

Example 5

50 parts by weight of dimethylpolysiloxane containing 5 mol % of diphenylsiloxy units (—Ph$_2$SiO—wherein Ph: phenyl) per molecule and having both molecular chain (molecular) terminals thereof blocked by hydroxyl groups, the 25° C. viscosity of the dimethylpolysiloxane being 20,000 cSt; 10 parts by weight of hydrophilic silica of 200 m$^2$/g in BET specific surface area; and 10 parts by weight of hydrophobic silica having its surface treated with hexamethyldisilazane, the BET specific surface area of the hydrophobic silica being 130 m$^2$/g, were agitated and mixed together at 150° C. for 2 hr. Thereafter, the mixture was diluted with 50 parts by weight of dimethylpolysiloxane containing 5 mol % of diphenylsiloxy units per molecule and having both molecular terminals thereof blocked by hydroxyl groups, the 25° C. viscosity of the dimethylpolysiloxane being 20,000 cSt. Further, the mixture was loaded with 10 parts by weight of methyltributanoximesilane, 0.1 part by weight of dibutyltin dioctoate and 1.0 part by weight of aminopropyltrimethoxysilane, and deaerated and mixed. The resultant composition was further loaded with 40 parts by weight of xylene, thereby obtaining a curable silicone solution of 20 mPa·s viscosity. This solution was applied by means of a coating roll machine onto an aluminum wall surface, thereby obtaining a 400 micron thick coating film. The composition was cured at 23° C. in 55% RH for 7 days. As a result, there was obtained a highly transparent coating cured product with a glossy surface, which exhibited such excellent rubber properties as 60 in durometer type A hardness and 4.0 MPa in tensile strength.

Comparative Example 3

50 parts by weight of dimethylpolysiloxane containing 5 mol % of diphenylsiloxy units per molecule and having both molecular chain terminals thereof blocked by hydroxyl groups, the 25° C. viscosity of the dimethylpolysiloxane being 20,000 cSt; and 20 parts by weight of hydrophilic silica of 200 m$^2$/g in BET specific surface area were agitated and mixed together at 150° C. for 2 hr. Thereafter, the mixture was diluted with 50 parts by weight of dimethylpolysiloxane containing 5 mol % of diphenylsiloxy units per molecule and having both molecular chain terminals thereof blocked by hydroxyl groups, the 25° C. viscosity of the dimethylpolysiloxane being 20,000 cSt. Further, the mixture was loaded with 10 parts by weight of methyltributanoximesilane, 0.1 part by weight of dibutyltin dioctoate and 1.0 part by weight of aminopropyltrimethoxysilane, and deaerated and mixed. The resultant composition was further loaded with 40 parts by weight of xylene, thereby obtaining a curable silicone solution of 13 mPa·s viscosity. This solution was applied by means of a coating roll machine onto an aluminum wall surface. The maximum coating film thickness obtainable was 100 microns. Attempts to obtain greater coating film thickness resulted in sagging.

Example 6

50 parts by weight of dimethylpolysiloxane having both molecular chain terminals thereof blocked by hydroxyl groups, the 25° C. viscosity of the dimethylpolysiloxane being 20,000 cSt; 5 parts by weight of hydrophilic silica of 200 m$^2$/g in BET specific surface area; and 10 parts by weight of hydrophobic silica having its surface treated with hexamethyldisilazane, the BET specific surface area of the hydrophobic silica being 130 m$^2$/g, were agitated and mixed together at 150° C. for 2 hr. Thereafter, the mixture was diluted with 50 parts by weight of dimethylpolysiloxane having both molecular chain terminals thereof blocked by hydroxyl groups, the 25° C. viscosity of the dimethylpolysiloxane being 20,000 cSt. Further, the mixture was loaded with 10 parts by weight of methyltributanoximesilane, 0.1 part by weight of dibutyltin dioctoate and 1.0 part by weight of aminopropyltrimethoxysilane, and deaerated and mixed. 20 parts by weight of methyl ethyl ketone was added to the mixture to thereby regulate the viscosity thereof. Thus, a curable silicone composition of 60 mPa·s viscosity was obtained. An electronic base plate was coated with this composition by means of a dispenser, and the composition was cured at 23° C. in 55% RH for 7 days. As a result, a glossy silicone film with very good appearance was formed on the base plate. This film exhibited such excellent rubber properties as 50 in durometer type A hardness and 3.5 MPa in tensile strength.

Comparative Example 4

50 parts by weight of dimethylpolysiloxane having both molecular chain terminals thereof blocked by hydroxyl groups, the 25° C. viscosity of the dimethylpolysiloxane being 20,000 cSt, was mixed with 15 parts by weight of hydrophobic silica having its surface treated with dimethyldichlorosilane, the BET specific surface area of the hydrophobic silica being 130 m$^2$/g, at room temperature.

Thereafter, the mixture was diluted with 50 parts by weight of dimethylpolysiloxane having both molecular chain terminals thereof blocked by hydroxyl groups, the 25° C. viscosity of the dimethylpolysiloxane being 20,000 cSt. Further, the mixture was loaded with 10 parts by weight of methyltributanoximesilane, 0.1 part by weight of dibutyltin dioctoate and 1.0 part by weight of aminopropyltrimethoxysilane, and deaerated and mixed. 20 parts by weight of methyl ethyl ketone was added to the mixture to thereby regulate the viscosity thereof. Thus, a curable silicone composition of 80 mPa·s viscosity was obtained.

An electronic base plate was coated with this composition by means of a dispenser. The deliverability through a nozzle was poor. The composition was cured at 23° C. in 55% RH for 7 days. As a result, a silicone film with milky dull surface was formed on the base plate.

Example 7

50 parts by weight of dimethylpolysiloxane having both molecular chain terminals thereof blocked by hydroxyl groups, the 25° C. viscosity of the dimethylpolysiloxane being 5,000 cSt; 5 parts by weight of hydrophilic silica of 200 m$^2$/g in BET specific surface area; and 5 parts by weight of hydrophobic silica having its surface treated with hexamethyldisilazane, the BET specific surface area of the hydrophobic silica being 130 m$^2$/g, were agitated and mixed together at 150° C. for 2 hr. Thereafter, the mixture was diluted with 50 parts by weight of dimethylpolysiloxane having both molecular chain terminals thereof blocked by hydroxyl groups, the 25° C. viscosity of the dimethylpolysiloxane being 5000 cSt. Further, the mixture was loaded with 2.0 parts by weight of zinc carbonate, 10 parts by weight of vinyltributanoximesilane and 1.5 parts by weight of aminopropyltrimethoxysilane and also loaded with platinum catalyst in such an amount that the platinum atom concentration was 300 ppm, and mixed. Thus, a curable silicone composition of 10 mPa·s viscosity was obtained. Glass fiber was dip coated with this composition, and the composition was cured at 23° C. in 55% RH for 7 days. As a result, there was obtained an excellent fire retardant coat film of about 1 mm nearly uniform thickness.

Comparative Example 5

10 parts by weight of hydrophilic silica of 200 m²/g in BET specific surface area was added to 50 parts by weight of dimethylpolysiloxane having both molecular chain terminals thereof blocked by hydroxyl groups, the 25° C. viscosity of the dimethylpolysiloxane being 5,000 cSt, and agitated and mixed together at 150° C. for 2 hr. Thereafter, the mixture was diluted with 50 parts by weight of dimethylpolysiloxane having both molecular chain terminals thereof blocked by hydroxyl groups, the 25° C. viscosity of the dimethylpolysiloxane being 5000 cSt. Further, the mixture was loaded with 2.0 parts by weight of zinc carbonate, 10 parts by weight of vinyltributanoximesilane and 1.5 parts by weight of aminopropyltrimethoxysilane and also loaded with platinum catalyst in such an amount that the platinum atom concentration was 300 ppm, and mixed. Thus, a curable silicone composition of 4 Pa·s viscosity was obtained. Glass fiber was dip coated with this composition, and the composition was cured at 23° C. in 55% RH for 7 days. Sagging and dropping occurred during the curing step, so that a fire retardant cured product of uniform thickness was not obtained.

Example 8

100 parts by weight of dimethylpolysiloxane having both molecular chain terminals thereof blocked by hydroxyl groups, the 25° C. viscosity of the dimethylpolysiloxane being 1,000,000 cSt; 30 parts by weight of hydrophilic silica of 200 m²/g in BET specific surface area; 15 parts by weight of hydrophobic silica having its surface treated with dimethyldichlorosilane, the BET specific surface area of the hydrophobic silica being 130 m²/g; and 10 parts by weight of dimethylpolysiloxane having both molecular chain terminals thereof blocked by hydroxyl groups, the average polymerization degree of the dimethylpolysiloxane being 13, were agitated and mixed together at 150° C. for 2 hr. The resultant composition was loaded with 10 parts by weight of vinyltributanoximesilane, 1.5 parts by weight of aminopropyltrimethoxysilane and 65 parts by weight of xylene. Thus, there was obtained a composition of high thixotropy exhibiting a viscosity, as measured by BL rotary viscometer, of 60 Pass upon 4 rotations and 4 Pass upon 20 rotations. This composition was cured at 23° C. in 55% RH for 7 days. As a result, there was obtained a highly transparent coating cured product with a glossy surface, which exhibited such excellent rubber properties as 65 in durometer type A hardness and 8.0 MPa in tensile strength.

Comparative Example 6

100 parts by weight of dimethylpolysiloxane having both molecular chain terminals thereof blocked by hydroxyl groups, the 25° C. viscosity of the dimethylpolysiloxane being 1,000,000 cSt; 45 parts by weight of hydrophilic silica of 200 m²/g in BET specific surface area; and 10 parts by weight of dimethylpolysiloxane having both molecular chain terminals thereof blocked by hydroxyl groups, the average polymerization degree of the dimethylpolysiloxane being 13, were agitated and mixed together at 150° C. for 2 hr. The resultant composition was loaded with 10 parts by weight of vinyltributanoximesilane, 1.5 parts by weight of aminopropyltrimethoxysilane and 65 parts by weight of xylene. The obtained composition had rather low thixotropy exhibiting a viscosity, as measured by BL rotary viscometer, of 12 Pa·s upon 4 rotations and 9 Pa·s upon 20 rotations.

Comparative Example 7

100 parts by weight of dimethylpolysiloxane having both molecular chain terminals thereof blocked by hydroxyl groups, the 25° C. viscosity of the dimethylpolysiloxane being 1,000,000 cSt; 45 parts by weight of hydrophobic silica having its surface treated with dimethyldichlorosilane, the BET specific surface area of the hydrophobic silica being 200 m²/g; and 10 parts by weight of dimethylpolysiloxane having both molecular chain terminals thereof blocked by hydroxyl groups, the average polymerization degree of the dimethylpolysiloxane being 13, were agitated and mixed together at room temperature for 2 hr. The resultant composition was loaded with 10 parts by weight of vinyltributanoximesilane, 1.5 parts by weight of aminopropyltrimethoxysilane and 65 parts by weight of xylene. The obtained composition had a high thixotropy exhibiting a viscosity, as measured by BM rotary viscometer, of 850 Pa·s upon 4 rotations and 180 Pa·s upon 20 rotations, but the viscosity thereof was extremely high.

Example 9

50 parts by weight of dimethylpolysiloxane having both molecular chain terminals thereof blocked by trimethoxysiloxy groups (—O—Si—(OCH$_3$)$_3$), the 25° C. viscosity of the dimethylpolysiloxane being 20,000 cSt; 5 parts by weight of hydrophilic silica (fumed silica) of 200 m²/g in BET specific surface area; and 5 parts by weight of hydrophobic fumed silica having its surface treated with hexamethyldisilazane, the BET specific surface area of the hydrophobic fumed silica being 130 m²/g, were agitated and mixed together at 150° C. for 2 hr. Thereafter, the mixture was diluted with 50 parts by weight of dimethylpolysiloxane having both molecular chain terminals thereof blocked by trimethoxysiloxy groups, the 25° C. viscosity of the dimethylpolysiloxane being 20,000 cSt. Further, the mixture was loaded with 5 parts by weight of methyltrimethoxysilane, 0.1 part by weight of dibutyltin dioctoate and 1.0 part by weight of aminopropyltrimethoxysilane, and deaerated and mixed. 20 parts by weight of methyl ethyl ketone was added to the mixture to thereby regulate the viscosity thereof. Thus, curable silicone composition 1L (hardening composition 1L) of 200 mPa·s viscosity was obtained. This composition was cured at 23° C. in 55% RH for 7 days. As a result, a glossy silicone film with very good appearance was formed on a base plate. This cured product exhibited such excellent rubber properties as 40 in durometer type A hardness and 2.7 MPa in tensile strength (as measured in accordance with Japanese Industrial Standard 6249).

Comparative Example 8

50 parts by weight of dimethylpolysiloxane having both molecular chain terminals thereof blocked by trimethoxysiloxy groups, the 25° C. viscosity of the dimethylpolysiloxane being 20,000 cSt, was agitated and mixed with 10 parts by weight of hydrophobic fumed silica having a BET specific surface area of 200 m²/g at room temperature for 2 hr. Thereafter, the mixture was diluted with 50 parts by weight of dimethylpolysiloxane having both molecular chain terminals thereof blocked by trimethoxysiloxy groups, the 25° C. viscosity of the dimethylpolysiloxane being 20,000 cSt. Further, the mixture was loaded with 5 parts by weight of methyltrimethoxysilane, 0.1 part by weight of dibutyltin dioctoate and 1.0 part by weight of aminopropyltrimethoxysilane, and deaerated and mixed. 20 parts by weight of methyl ethyl ketone was added to the mixture to thereby regulate the viscosity thereof. Thus, a curable silicone composition (1M) of 480 mPa·s viscosity was obtained. An electronic base plate was coated with this composition (1M) by means of a dispenser. The deliverability through a nozzle was poorer than that of the composition of Example 9. The composition was cured at 23° C. in 55% RH for 7 days. As a result, a silicone film with milky dull surface was formed on the base plate. This cured product exhibited a durometer type A hardness of 35 and a tensile strength of 2.0 MPa (as measured in accordance with Japanese Industrial Standard 6249).

It is apparent from the results of Examples 5 to 9 and Comparative Examples 3 to 8 that the curable compositions of the present invention have low viscosity and high thixotropy and are excellent in not only coating applicability but also coating film strength, surface smoothness and other properties.

Examples 10 to 13 and Comparative Examples 9 to 12

Antifouling paint compositions were prepared in the same manner as in Example 1, except that, in place of the organopolysiloxane composition (1A) of Example 1, curable silicone composition 1L of Example 9 was employed in Examples 10 to 13 and curable silicone composition 1M of Comparative Example 8 was employed in Comparative Examples 9 to 12 and except that silicone oil and xylene were used in amounts specified in Table 5. The properties of the obtained antifouling paint compositions were evaluated in the same manner as in Example 1.

Results are given in Tables 5 to 8.

Table 5, like Table 2, lists the properties and coating applicability of curable compositions formulated into paints. Table 6, like Table 3, lists the antifouling properties exhibited after conversion into paints. Table 7 lists the properties of paints having been stored for a given period of time. Table 8, like Table 4, lists the antifouling properties exhibited by paints after storage.

TABLE 5

|  |  |  | Example 10 | Example 11 | Example 12 | Example 13 | Comp. Ex. 9 | Comp Ex. 10 | Comp. Ex. 11 | Comp. Ex. 12 |
|---|---|---|---|---|---|---|---|---|---|---|
| organopolysiloxane (paint) compsn. | | type | 1L | 1L | 1L | 1L | 1M | 1M | 1M | 1M |
| | | amt. | 100 | 100 | 100 | 100 | 100 | 100 | 100 | 100 |
| silicone oil | SH550 *7 | | | | | | | | 20 (21) | |
| | TSF431 *8 | | 60 (64) | | | 70 (75) | | 40 (43) | | |
| | KF50 *9 | | | 80 (85) | 60 (64) | | 30 (32) | 30 (32) | 60 (64) | |
| | silicone oil of Synthetic Ex. 1 | | | | 30 (32) | | 40 (43) | | | |
| | KF-6016 *10 | | | | | 10 (11) | | | | |
| xylene | | | 5 | 5 | 5 | 5 | 5 | 5 | 5 | 5 |
| properties of paint | viscosity (Pa · s/25° C.) | | 110 | 100 | 90 | 100 | 190 | 180 | 150 | 230 |
| | specific gravity (20° C.) | | 0.99 | 0.99 | 0.99 | 0.99 | 0.99 | 0.99 | 0.99 | 0.99 |
| applicability | sprayability | | good | good | good | good | clogged | clogged | clogged | clogged |
| | sagging (limit film thickness μm) | | 180 | 160 | 150 | 170 | 130 | 120 | 110 | 140 |

*7: produced by Dow Corning Toray Silicone Co., Ltd.
*8: produced by Toshiba Silicone Co., Ltd.
*9: produced by Shin-Etsu Chemical Co., Ltd.
*10: produced by Shin-Etsu Chemical Co., Ltd.
Note: parenthesized amount of silicone oils indicates the addition amount (pts. wt.) per 100 parts by weight of organopolysiloxane (A).

TABLE 6

|  |  | Example 10 | Example 11 | Example 12 | Example 13 | Comp. Ex. 9 | Comp. Ex. 10 | Comp. Ex.11 | Comp. Ex. 12 |
|---|---|---|---|---|---|---|---|---|---|
| antifouling property | 6 months | normal | normal | normal | normal | normal | slime slightly adhered | slime slightly adhered | slime slightly adhered |
| | 12 months | normal | normal | normal | normal | slime slightly adhered | slime slightly adhered | slime slightly adhered | slime slightly adhered |
| | 18 months | normal | normal | normal | normal | slime/shell-fish slightly adhered | slime slightly adhered | slime/shell-fish adhered much | slime/shell-fish adhered much |
| | 24 months | normal | normal | normal | normal | slime/shell-fish adhered much | slime/shell-fish/sea lettuce adhered | slime/shell-fish/sea lettuce adhered | slime/shell-fish/sea lettuce adhered |
| | 30 months | slime slightly adhered | slime slightly adhered | slime slightly adhered | slime slightly adhered | slime/shell-fish/sea lettuce adhered | slime/shell-fish/sea lettuce adhered | slime/shell-fish/sea lettuce adhered | slime/shell-fish/sea lettuce adhered |

TABLE 7

|  |  |  | Example 10 | Example 11 | Example 12 | Example 13 | Comp. Ex. 9 | Comp. Ex. 10 | Comp. Ex. 11 | Comp. Ex. 12 |
|---|---|---|---|---|---|---|---|---|---|---|
| organopolysiloxane compsn. | | type | 1L | 1L | 1L | 1L | 1M | 1M | 1M | 1M |
| | | amt. | 100 | 100 | 100 | 100 | 100 | 100 | 100 | 100 |
| silicone oil | SH550 *7 | | | | | | | | 20 (21) | |
| | TSF431 *8 | | 60 (64) | | | 70 (75) | | 40 (43) | | |
| | KF50 *9 | | | 80 (85) | 60 (64) | | 30 (32) | 30 (32) | 60 (64) | |
| | silicone oil of Synthetic Ex. 1 | | | | 30 (32) | | 40 (43) | | | |
| | KF-6016 *10 | | | | | 10 | | | | |
| xylene | | | 5 | 5 | 5 | 5 | 5 | 5 | 5 | 5 |
| after 3 months at 50° C. | condition of paint (stability) | | normal | normal | normal | normal | gelatinized | gelatinized | gelatinized | gelatinized |
| | sprayability | | good | good | good | good | clogged | clogged | clogged | clogged |
| | sagging (limit film thickness μm) | | 180 | 160 | 150 | 170 | 110 | 110 | 100 | 120 |

*7: produced by Dow Corning Toray Silicone Co., Ltd.
*8: produced by Toshiba Silicone Co., Ltd.
*9: produced by Shin-Etsu Chemical Co., Ltd.
*10: produced by Shin-Etsu Chemical Co., Ltd.
Note: parenthesized amount of silicone oils indicates the addition amount (pts. wt.) per 100 parts by weight of organopolysiloxane (A).

TABLE 8

| | | Example 10 | Example 11 | Example 12 | Example 13 | Comp. Ex. 9 | Comp. Ex. 10 | Comp. Ex. 11 | Comp. Ex. 12 |
|---|---|---|---|---|---|---|---|---|---|
| antifouling property | 6 months | normal | normal | normal | normal | slime slightly adhered | slime slightly adhered | slime adhered much | slime adhered much |
| | 12 months | normal | normal | normal | normal | slime/shellfish slightly adhered | slime/shellfish slightly adhered | slime/shellfish slightly adhered | slime/shellfish slightly adhered |
| | 18 months | normal | normal | normal | normal | slime/shell-adhered much | slime/shellfish adhered much | slime/shellfish adhered much | slime/shellfish adhered much |
| | 24 months | normal | normal | normal | normal | slime/shellfish adhered much | slime/shellfish/sea lettuce adhered | slime/shellfish/sea lettuce adhered | slime/shellfish/sea lettuce adhered |
| | 30 months | slime slightly adhered | slime slightly adhered | slime slightly adhered | slime slightly adhered | slime/shellfish/sea lettuce adhered | slime/shellfish/sea lettuce adhered | slime/shellfish/sea lettuce adhered | slime/shellfish/sea lettuce adhered |

Preparation of organopolysiloxane paint compositions (2A) to (2F) indicated in Table 9 Curable organopolysiloxane paint compositions of the formulations (2A) to (2F) specified in Table 9 were prepared in the same manner as the organopolysiloxane paint composition (1A) specified in Table 1.

The properties and physical characteristics of coating film thereof are given in Table 9. The testing method and *1 to *6 of Table 9 are the same as those described with respect to the organopolysiloxane paint compositions (1A) to (1F) of Table 1.

TABLE 9

| | Organopolysiloxane paint composition | | | | | |
|---|---|---|---|---|---|---|
| | Example | | | | Comp. Ex | |
| | 2A | 2B | 2C | 2D | 2E | 2F |
| organopolysiloxane *1 | 50 | 25 | 25 | 0 | 0 | 0 |
| thermally treated hydrophobic fumed silica mixture *2 | 60 | 90 | 90 | 120 | | |
| (hydrophobic fumed silica *5) | (10) | (15) | (15) | (20) | | |
| (organopolysiloxane *6) | (50) | (75) | (75) | (100) | | |
| room temp. treated hydrophobic fumed silica mixture *3 | | | | | 120 | |
| (hydrophobic fumed silica *5) | | | | | (20) | |
| (organopolysiloxane *6) | | | | | (100) | |
| thermally treated hydrophilic silica mixture *4 | | | | | | 120 |
| (hydrophilic silica *5) | | | | | | (20) |
| (organopolysiloxane *6) | | | | | | (100) |
| (total organopolysiloxane (A) compo- nent in compsn.) | (100) | (100) | (100) | (100) | (100) | (100) |

TABLE 9-continued

|  |  | Organopolysiloxane paint composition |  |  |  |  |  |
|---|---|---|---|---|---|---|---|
|  |  | Example | | | | Comp. Ex | |
|  |  | 2A | 2B | 2C | 2D | 2E | 2F |
| methyltri (methylethylketoxime) silane | |  |  | 10 | 10 | 10 | 10 |
| methyltriacetoxysilane | | 7 | 7 |  |  |  |  |
| dibutyltin dilaurate | | 0.1 | 0.1 | 0.1 | 0.1 | 0.1 | 0.1 |
| xylene | | 20 | 20 | 20 | 20 | 20 | 20 |
| properties | viscosity (Pa · s/25° C.) | 0.7 | 0.8 | 0.8 | 0.9 | 0.8 | 0.5 |
|  | specific gravity (20° C.) | 0.99 | 0.99 | 0.99 | 0.99 | 0.89 | 0.98 |
| physical | hardness (JIS-K) | 45 | 47 | 47 | 49 | 39 | 45 |
| characteristic | tensile strength (MPa) | 3.5 | 3.6 | 3.8 | 3.8 | 2.9 | 3.5 |
| of film | elongation (%) | 230 | 210 | 210 | 200 | 170 | 190 |

*1, 2, 3, 4, 5: produced by Shin-Etsu Chemical Co., Ltd.
*1: organopolysiloxane (weight) added at the time of composition preparation.
*2: 3, 4: numeric value indicates the addition amount (weight) of silica/organopolysiloxane treatment product.
*5:) silica (weight) contained in silica/organopolysiloxane treatment product.
*6:) organopolysiloxane (weight) contained in silica/organopolysiloxane treatment product.

Examples 14 to 17. Comparative Examples 13 and 14

Silicone oil and xylene were mixed, in proportions indicated in Table 10, with 100 parts by weight of each of the organopolysiloxane paint compositions (2A) to (2F) specified in Table 9, and agitated until becoming homogeneous, thereby obtaining antifouling paint compositions.

The properties and coating applicability of each of the antifouling paint compositions were measured in the above manner.

Results are given in Table 10.

The antifouling test of each of the antifouling paint compositions immediately after preparation was carried out in the above manner.

Results are given in Table 11.

The *7, *8, *9 and *10 and testing method of Table 10 are the same as aforementioned. The parenthesized amount of various silicone oils is parts by weight added per 100 parts by weight of organopolysiloxane (A), as aforementioned.

With respect to each of the antifouling paint compositions, the condition of paint (stability) and coating applicability after stocking at 50° C. for 3 months after the preparation thereof were tested in the aforementioned manner.

Results are also given in Table 10.

Furthermore, with respect to each of the antifouling paint compositions having been stocked at 50° C. for 3 months after the preparation thereof, the aforementioned antifouling test was carried out.

Results are given in Table 12.

TABLE 10

|  |  |  | Example 14 | Example 15 | Example 16 | Example 17 | Comp. Ex. 13 | Comp. Ex. 14 |
|---|---|---|---|---|---|---|---|---|
| organopolysiloxane compsn. |  | type | 2A | 2B | 2C | 2D | 2E | 2F |
|  |  | amt. | 100 | 100 | 100 | 100 | 100 | 100 |
| silicone oil | SH550 *7 |  | 50 (53) |  |  |  |  |  |
|  | TSF431 *8 |  |  | 60 (64) |  |  |  | 40 (43) |
|  | KF50-100 *9 |  | 20 (21) |  | 80 (85) | 60 (64) | 30 (32) | 30 (32) |
|  | organopolysiloxane of Synthetic Ex. 1 (silicone oil (D)) |  |  |  |  | 30 (32) | 40 (43) |  |
|  | KF-6016 *10 |  |  |  |  |  |  |  |
| xylene |  |  | 10 | 10 | 10 | 10 | 10 | 10 |
| properties of paint | viscosity (Pa · s/25° C.) |  | 0.4 | 0.5 | 0.4 | 0.5 | 0.5 | 0.2 |
|  | specific gravity (20 ° C.) |  | 0.99 | 0.99 | 0.99 | 0.99 | 0.99 | 0.99 |
| applicability | sprayability |  | good | good | good | good | good | good |
|  | sagging (limit film thickness μm) |  | 180 | 180 | 170 | 180 | 160 | 130 |
| after 3 months at 50° C. | condition of paint (stability) |  | normal | normal | normal | normal | gelatinized | gelatinized |
|  | sprayability |  | good | good | good | good | clogged | clogged |
|  | sagging (limit film thickness μm) |  | 180 | 180 | 170 | 180 | 140 | 110 |

*7: produced by Dow Corning Toray Silicone Co., Ltd.
*8: produced by Toshiba Silicone Co., Ltd.
*9: produced by Shin-Etsu Chemical Co., Ltd.
*10: produced by Shin-Etsu Chemical Co., Ltd.
Note: parenthesized amount of silicone oils indicates the addition amount (pts. wt.) per 100 parts by weight of solid contents produced from organopolysiloxane compsn.

TABLE 11

|  |  | Example 14 | Example 15 | Example 16 | Example 17 | Comp. Ex. 13 | Comp. Ex. 14 |
|---|---|---|---|---|---|---|---|
| anti-fouling property | 6 months | normal | normal | normal | normal | normal | normal |
|  | 12 months | normal | normal | normal | normal | normal | normal |
|  | 18 months | normal | normal | normal | normal | normal | slime slightly adhered |
|  | 24 months | normal | normal | normal | normal | slime/shellfish slightly adhered | slime/shellfish/sea lettuce adhered |
|  | 30 months | slime slightly adhered | slime slightly adhered | slime slightly adhered | slime slightly adhered | slime/shellfish/sea lettuce adhered | slime/shellfish/sea lettuce adhered |

TABLE 12

|  |  | Example 14 | Example 15 | Example 16 | Example 17 | Comp. Ex. 13 | Comp. Ex. 14 |
|---|---|---|---|---|---|---|---|
| anti-fouling property | 6 months | normal | normal | normal | normal | slime slightly adhered | slime adhered much |
|  | 12 months | normal | normal | normal | normal | slime adhered much | slime/shellfish adhered much |
|  | 18 months | normal | normal | normal | normal | slime/shellfish slightly adhered | slime/shellfish adhered much |
|  | 24 months | normal | normal | normal | normal | slime/shellfish adhered much | slime/shellfish/sea lettuce adhered |
|  | 30 months | slime slightly adhered | slime slightly adhered | slime slightly adhered | slime slightly adhered | slime/shellfish/sea lettuce adhered | slime/shellfish/sea lettuce adhered |

Example 18

50 parts by weight of dimethylpolysiloxane containing 5 mol % of diphenylsiloxy units (—Ph$_2$SiO—wherein Ph: phenyl) per molecule and having both molecular chain (molecular) terminals thereof blocked by hydroxyl groups, the 25° C. viscosity of the dimethylpolysiloxane being 20,000 cSt; and 20 parts by weight of hydrophobic fumed silica having its surface treated with hexamethyldisilazane, the BET specific surface area of the hydrophobic fumed silica being 130 m$^2$/g, were agitated and mixed together at 150° C. for 2 hr. Thereafter, the mixture was diluted with 50 parts by weight of dimethylpolysiloxane containing 5 mol % of diphenylsiloxy units per molecule and having both molecular terminals thereof blocked by hydroxyl groups, the 25° C. viscosity of the dimethylpolysiloxane being 20,000 cSt. Further, the mixture was loaded with 10 parts by weight of methyltributanoximesilane, 0.1 part by weight of dibutyltin dioctoate and 1.0 part by weight of aminopropyltrimethoxysilane, and deaerated and mixed. The resultant composition was further loaded with 40 parts by weight of xylene, thereby obtaining a curable silicone solution of 28 mPa·s. This solution was applied by means of a coating roll machine onto an aluminum wall surface, thereby obtaining a 400 micron thick coating film. The composition was cured at 23° C. in 55% RH for 7 days. As a result, there was obtained a highly transparent coating cured product with a glossy surface, which exhibited such excellent rubber properties as 58 in durometer type A hardness and 4.5 MPa in tensile strength.

Comparative Example 15

50 parts by weight of dimethylpolysiloxane containing 5 mol % of diphenylsiloxy units per molecule and having both molecular chain terminals thereof blocked by hydroxyl groups, the 25° C. viscosity of the dimethylpolysiloxane being 20,000 cSt; and 20 parts by weight of fumed silica of 200 m$^2$/g in BET specific surface area were agitated and mixed together at 150° C. for 2 hr. Thereafter, the mixture was diluted with 50 parts by weight of dimethylpolysiloxane containing 5 mol % of diphenylsiloxy units per molecule and having both molecular chain terminals thereof blocked by hydroxyl groups, the 25° C. viscosity of the dimethylpolysiloxane being 20,000 cSt. Further, the mixture was loaded with 10 parts by weight of methyltributanoximesilane, 0.1 part by weight of dibutyltin dioctoate and 1.0 part by weight of aminopropyltrimethoxysilane, and deaerated and mixed. The resultant composition was further loaded with 40 parts by weight of xylene, thereby obtaining a curable silicone solution of 13 mPa·s. This solution was applied by means of a coating roll machine onto an aluminum wall surface. The maximum coating film thickness obtainable was 100 microns. Attempts to obtain greater coating film thickness resulted in sagging.

Example 19

50 parts by weight of dimethylpolysiloxane having both molecular chain terminals thereof blocked by hydroxyl groups, the 25° C. viscosity of the dimethylpolysiloxane being 20,000 cSt; and 10 parts by weight of hydrophobic fumed silica having its surface treated with hexamethyldisilazane, the BET specific surface area of the hydrophobic fumed silica being 130 m$^2$/g, were agitated and mixed together at 150° C. for 2 hr. Thereafter, the mixture was diluted with 50 parts by weight of dimethylpolysiloxane having both molecular chain terminals thereof blocked by hydroxyl groups, the 25° C. viscosity of the dimethylpolysiloxane being 20,000 cSt. Further, the mixture was loaded with 10 parts by weight of methyltributanoximesilane, 0.1 part by weight of dibutyltin dioctoate and 1.0 part by weight of aminopropyltrimethoxysilane, and deaerated and mixed. 20 parts by weight of methyl ethyl ketone was added to the mixture to thereby regulate the viscosity thereof. Thus, a curable silicone composition of 45 mPa·s viscosity was obtained. An electronic base plate was coated with this composition by means of a dispenser, and the composition was cured at 23° C. in 55% RH for 7 days. As a result, a silicone film with very good appearance was formed on the base plate. This film exhibited such excellent rubber properties as 35 in durometer type A hardness and 2.7 MPa in tensile strength.

Comparative Example 16

50 parts by weight of dimethylpolysiloxane having both molecular chain terminals thereof blocked by hydroxyl groups, the 25° C. viscosity of the dimethylpolysiloxane being 20,000 cSt, was mixed with 15 parts by weight of hydrophobic fumed silica having its surface treated with dimethyldichlorosilane, the BET specific surface area of the hydrophobic fumed silica being 130 m$^2$/g, at room temperature.

Thereafter, the mixture was diluted with 50 parts by weight of dimethylpolysiloxane having both molecular chain terminals thereof blocked by hydroxyl groups, the 25° C. viscosity of the dimethylpolysiloxane being 20,000 cSt. Further, the mixture was loaded with 10 parts by weight of methyltributanoximesilane, 0.1 part by weight of dibutyltin dioctoate and 1.0 part by weight of aminopropyltrimethoxysilane, and deaerated and mixed. 20 parts by weight of methyl ethyl ketone was added to the mixture to thereby regulate the viscosity thereof. Thus, a curable silicone composition of 80 mPa·s viscosity was obtained.

An electronic base plate was coated with this composition by means of a dispenser. The deliverability through a nozzle was poor. The composition was cured at 23° C. in 55% RH for 7 days. As a result, a silicone film with milky dull surface was formed on the base plate.

Example 20

50 parts by weight of dimethylpolysiloxane having both molecular chain terminals thereof blocked by hydroxyl groups, the 25° C. viscosity of the dimethylpolysiloxane being 5,000 cSt; and 10 parts by weight of hydrophobic fumed silica having its surface treated with hexamethyldisilazane, the BET specific surface area of the hydrophobic fumed silica being 130 m$^2$/g, were agitated and mixed together at 150° C. for 2 hr. Thereafter, the mixture was diluted with 50 parts by weight of dimethylpolysiloxane having both molecular chain terminals thereof blocked by hydroxyl groups, the 25° C. viscosity of the dimethylpolysiloxane being 5000 cSt. Further, the mixture was loaded with 2.0 parts by weight of zinc carbonate, 10 parts by weight of vinyltributanoximesilane and 1.5 parts by weight of aminopropyltrimethoxysilane and also loaded with platinum catalyst in such an amount that the platinum atom concentration was 300 ppm, and mixed. Thus, a curable silicone composition of 15 mPa·s viscosity was obtained. Glass fiber was dip coated with this composition, and the composition was cured at 23° C. in 55% RH for 7 days. As a result, there was obtained an excellent fire retardant coat film of about 1 mm nearly uniform thickness.

Comparative Example 17

10 parts by weight of fumed silica of 200 m$^2$/g in BET specific surface area was added to 50 parts by weight of dimethylpolysiloxane having both molecular chain terminals thereof blocked by hydroxyl groups, the 25° C. viscosity of the dimethylpolysiloxane being 5,000 cSt, and agitated and mixed together at 150° C. for 2 hr. Thereafter, the mixture was diluted with 50 parts by weight of dimethylpolysiloxane having both molecular chain terminals thereof blocked by hydroxyl groups, the 25° C. viscosity of the dimethylpolysiloxane being 5000 cSt. Further, the mixture was loaded with 2.0 parts by weight of zinc carbonate, 10 parts by weight of vinyltributanoximesilane and 1.5 parts by weight of aminopropyltrimethoxysilane and also loaded with platinum catalyst in such an amount that the platinum atom concentration was 300 ppm, and mixed. Thus, a curable silicone composition of 4 Pa·s viscosity was obtained. Glass fiber was dip coated with this composition, and the composition was cured at 23° C. in 55% RH for 7 days. Sagging and dropping occurred during the curing step, so that a fire retardant cured product of uniform thickness was not obtained.

Example 20

100 parts by weight of dimethylpolysiloxane having both molecular chain terminals thereof blocked by hydroxyl groups, the 25° C. viscosity of the dimethylpolysiloxane being 1,000,000 cSt; 45 parts by weight of hydrophobic fumed silica having its surface treated with dimethyldichlorosilane, the BET specific surface area of the hydrophobic fumed silica being 130 m$^2$/g; and 10 parts by weight of dimethylpolysiloxane having both molecular chain terminals thereof blocked by hydroxyl groups, the average polymerization degree of the dimethylpolysiloxane being 13, were agitated and mixed together at 150° C. for 2 hr. The resultant composition was loaded with 10 parts by weight of vinyltributanoximesilane, 1.5 parts by weight of aminopropyltrimethoxysilane and 65 parts by weight of xylene. Thus, there was obtained a composition of high thixotropy exhibiting a viscosity, as measured by BL rotary viscometer, of 100 Pa·s upon 4 rotations and 15 Pa·s upon 20 rotations. This composition was cured at 23° C. in 55% RH for 7 days. As a result, there was obtained a highly transparent coating cured product, which exhibited such excellent rubber properties as 65 in durometer type A hardness and 6.5 MPa in tensile strength.

Comparative Example 18

100 parts by weight of dimethylpolysiloxane having both molecular chain terminals thereof blocked by hydroxyl groups, the 25° C. viscosity of the dimethylpolysiloxane being 1,000,000 cSt; 45 parts by weight of fumed silica of 200 m²/g in BET specific surface area; and 10 parts by weight of dimethylpolysiloxane having both molecular chain terminals thereof blocked by hydroxyl groups, the average polymerization degree of the dimethylpolysiloxane being 13, were agitated and mixed together at 150° C. for 2 hr. The resultant composition was loaded with 10 parts by weight of vinyltributanoximesilane, 1.5 parts by weight of aminopropyltrimethoxysilane and 65 parts by weight of xylene. The obtained composition had rather low thixotropy exhibiting a viscosity, as measured by BL rotary viscometer, of 12 Pa·s upon 4 rotations and 9 Pa·s upon 20 rotations.

Comparative Example 19

100 parts by weight of dimethylpolysiloxane having both molecular chain terminals thereof blocked by hydroxyl groups, the 25° C. viscosity of the dimethylpolysiloxane being 1,000,000 cSt; 45 parts by weight of hydrophobic fumed silica having its surface treated with dimethyldichlorosilane, the BET specific surface area of the hydrophobic fumed silica being 200 m²/g; and 10 parts by weight of dimethylpolysiloxane having both molecular chain terminals thereof blocked by hydroxyl groups, the average polymerization degree of the dimethylpolysiloxane being 13, were agitated and mixed together at room temperature for 2 hr. The resultant composition was loaded with 10 parts by weight of vinyltributanoximesilane, 1.5 parts by weight of aminopropyltrimethoxysilane and 65 parts by weight of xylene. The obtained composition had a high thixotropy exhibiting a viscosity, as measured by BM rotary viscometer, of 850 Pa·s upon 4 rotations and 180 Pa·s upon 20 rotations, but the viscosity thereof was extremely high.

Example 22

50 parts by weight of dimethylpolysiloxane having both molecular chain terminals thereof blocked by trimethoxysiloxy groups (—O—Si—(OCH$_3$)$_3$), the 25° C. viscosity of the dimethylpolysiloxane being 20,000 cSt; and 10 parts by weight of hydrophobic fumed silica having its surface treated with hexamethyldisilazane, the BET specific surface area of the hydrophobic fumed silica being 130 m²/g, were agitated and mixed together at 150° C. for 2 hr. Thereafter, the mixture was diluted with 50 parts by weight of dimethylpolysiloxane having both molecular chain terminals thereof blocked by trimethoxysiloxy groups, the 25° C. viscosity of the dimethylpolysiloxane being 20,000 cSt. Further, the mixture was loaded with 5 parts by weight of methyltrimethoxysilane, 0.1 part by weight of dibutyltin dioctoate and 1.0 part by weight of aminopropyltrimethoxysilane, and deaerated and mixed. 20 parts by weight of methyl ethyl ketone was added to the mixture to thereby regulate the viscosity thereof. Thus, curable silicone composition 2L (curable composition 2L) of 400 mPa·s viscosity was obtained. This composition was cured at 23° C. in 55% RH for 7 days. As a result, a silicone film with very good appearance was formed on a base plate. This cured product exhibited such excellent rubber properties as 40 in durometer type A hardness and 2.0 MPa in tensile strength (as measured in accordance with Japanese Industrial Standard 6249).

Comparative Example 20

50 parts by weight of dimethylpolysiloxane having both molecular chain terminals thereof blocked by trimethoxysiloxy groups, the 25° C. viscosity of the dimethylpolysiloxane being 20,000 cSt, was agitated and mixed with 10 parts by weight of hydrophobic fumed silica having a BET specific surface area of 200 m²/g at room temperature for 2 hr. Thereafter, the mixture was diluted with 50 parts by weight of dimethylpolysiloxane having both molecular chain terminals thereof blocked by trimethoxysiloxy groups, the 25° C. viscosity of the dimethylpolysiloxane being 20,000 cSt. Further, the mixture was loaded with 5 parts by weight of methyltrimethoxysilane, 0.1 part by weight of dibutyltin dioctoate and 1.0 part by weight of aminopropyltrimethoxysilane, and deaerated and mixed. 20 parts by weight of methyl ethyl ketone was added to the mixture to thereby regulate the viscosity thereof. Thus, a curable silicone composition (2M) of 480 mPa·s viscosity was obtained. An electronic base plate was coated with this composition (2M) by means of a dispenser. The deliverability through a nozzle was poorer than that of the composition of Example 9. The composition was cured at 23° C. in 55% RH for 7 days. As a result, a silicone film with milky dull surface was formed on the base plate. This cured product exhibited a durometer type A hardness of 35 and a tensile strength of 2.0 MPa (as measured in accordance with Japanese Industrial Standard 6249). It is apparent from the results of Examples 18 to 22 and Comparative Examples 15 to 20 that the curable compositions of the present invention have low viscosity and high thixotropy and are excellent in not only coating applicability but also coating film strength, surface smoothness and other properties.

Examples 23 to 26 and Comparative Examples 20 to 24

Antifouling paint compositions were prepared in the same manner as in Example 14, except that, in place of the organopolysiloxane composition 2A of Example 14, curable silicone composition 2L of Example 22 was employed in Examples 23 to 26 and curable silicone composition 2M of Comparative Example 20 was employed in Comparative Examples 20 to 24 and except that silicone oil and xylene were used in amounts specified in Table 13. The properties of the obtained antifouling paint compositions were evaluated in the same manner as in Example 14.

Results are given in Tables 13 to 16.

Table 13, like Table 10, lists the properties and coating applicability of curable compositions formulated into paints. Table 14, like Table 11, lists the antifouling properties exhibited after conversion into paints. Table 15, like Table 10, lists the properties of paints having been stored for a given period of time. Table 16, like Table 12, lists the antifouling properties exhibited by paints after storage.

TABLE 13

|  |  |  | Example 23 | Example 24 | Example 25 | Example 26 | Comp. Ex. 21 | Comp. Ex. 22 | Comp. Ex. 23 | Comp. Ex. 24 |
| --- | --- | --- | --- | --- | --- | --- | --- | --- | --- | --- |
| organopolysiloxane compsn. |  | type | 2L | 2L | 2L | 2L | 2M | 2M | 2M | 2M |
|  |  | amt. | 100 | 100 | 100 | 100 | 100 | 100 | 100 | 100 |
| silicone oil | SH550 | *7 | 50 (53) |  |  |  |  |  | 20 (21) |  |
|  | TSF431 | *8 |  | 60 (64) |  |  |  | 40 (43) |  | 70 (75) |
|  | KF50-100 | *9 | 20 (21) |  | 80 (85) | 60 (64) | 30 (32) | 30 (32) | 60 (64) |  |

TABLE 13-continued

|  |  |  | Example 23 | Example 24 | Example 25 | Example 26 | Comp. Ex. 21 | Comp. Ex. 22 | Comp. Ex. 23 | Comp. Ex. 24 |
|---|---|---|---|---|---|---|---|---|---|---|
|  | silicone oil of Synthetic Ex. 1 |  |  |  |  | 30 (32) | 40 (43) |  |  |  |
|  | KF-6016 | *10 |  |  |  |  |  |  |  | 10 (11) |
| xylene |  |  | 5 | 5 | 5 | 5 | 5 | 5 | 5 | 5 |
| pro- | viscosity (mPa · s/25° C.) |  | 100 | 110 | 100 | 90 | 190 | 180 | 150 | 150 |
| perties of paint | specific gravity (20° C.) |  | 0.99 | 0.99 | 0.99 | 0.99 | 0.99 | 0.99 | 0.99 | 0.99 |
| applica- | sprayability |  | good | good | good | good | clogged | clogged | clogged | clogged |
| bility | sagging (limit film thickness μm) |  | 170 | 180 | 160 | 150 | 130 | 120 | 110 | 110 |

*7 produced by Dow Corning Toray Silicone Co., Ltd.
*8 produced by Toshiba Silicone Co., Ltd.
*9 produced by Shin-Etsu Chemical Co., Ltd.
*10 produced by Shin-Etsu Chemical Co., Ltd.
Note: parenthesized amount of silicone oils indicates the addition amount (pts. wt.) per 100 parts by weight of solid contents produced from organopolysiloxane compsn.

TABLE 14

|  |  | Example 23 | Example 24 | Example 25 | Example 26 | Comp. Ex. 21 | Comp. Ex. 22 | Comp. Ex. 23 | Comp. Ex. 24 |
|---|---|---|---|---|---|---|---|---|---|
| anti- fouling property | 6 months | normal | normal | normal | normal | normal | slime slightly adhered | slime slightly adhered | slime slightly adhered |
|  | 12 months | normal | normal | normal | normal | slime slightly adhered | slime slightly adhered | slime slightly adhered | slime slightly adhered |
|  | 18 months | normal | normal | normal | normal | slime/ shellfish slightly adhered | slime slightly adhered | slime/ shellfish adhered much | slime/ shellfish adhered much |
|  | 24 months | normal | normal | normal | normal | slime/ shellfish adhered much | slime/ shell- fish/sea lettuce adhered | slime/ shell- fish/sea lettuce adhered | slime/ shell- fish/sea lettuce adhered |
|  | 30 months | slime slightly adhered | slime slightly adhered | slime slightly adhered | slime slightly adhered | slime/ shell- fish/sea lettuce adhered | slime/ shell- fish/sea lettuce adhered | slime/ shell- fish/sea lettuce adhered | slime/ shell- fish/sea lettuce adhered |

TABLE 15

|  |  |  | Example 23 | Example 24 | Example 25 | Example 26 | Comp. Ex. 21 | Comp. Ex. 22 | Comp. Ex. 23 | Comp. Ex. 24 |
|---|---|---|---|---|---|---|---|---|---|---|
| organopolysiloxane compsn. |  | type | 2L | 2L | 2L | 2L | 2M | 2M | 2M | 2M |
|  |  | amt. | 100 | 100 | 100 | 100 | 100 | 100 | 100 | 100 |
| silicone oil | SH550 | *7 | 50 (53) |  |  |  |  |  | 20 (21) |  |
|  | TSF431 | *8 |  | 60 (64) |  |  |  |  | 40 (43) | 70 (75) |
|  | KF50-100 | *9 | 20 (21) |  | 80 (85) | 60 (64) | 30 (32) | 30 (32) | 60 (64) |  |
|  | silicone oil of Synthetic Ex. 1 |  |  |  |  | 30 (32) | 40 (43) |  |  |  |
|  | KF-6016 | *10 |  |  |  |  |  |  |  | 10 (11) |
| xylene |  |  | 5 | 5 | 5 | 5 | 5 | 5 | 5 | 5 |
| after 3 months at 50° C. | condition of paint (stability) |  | normal | normal | normal | normal | gelatinized | gelatinized | gelatinized | gelatinized |
|  | sprayability |  | good | good | good | good | clogged | clogged | clogged | clogged |
|  | sagging (limit film thickness μm) |  | 170 | 180 | 160 | 150 | 110 | 110 | 100 | 100 |

*7 produced by Dow Corning Toray Silicone Co., Ltd.
*8 produced by Toshiba Silicone Co., Ltd.
*9 produced by Shin-Etsu Chemical Co., Ltd.
*10 produced by Shin-Etsu Chemical Co., Ltd.
Note: parenthesized amount of silicone oils indicates the addition amount (pts. wt.) per 100 parts by weight of solid contents produced from organopolysiloxane compsn.

TABLE 16

|  | | Example 23 | Example 24 | Example 25 | Example 26 | Comp. Ex. 21 | Comp. Ex. 22 | Comp. Ex. 23 | Comp. Ex. 24 |
|---|---|---|---|---|---|---|---|---|---|
| anti-fouling property | 6 months | normal | normal | normal | normal | slime slightly adhered | slime slightly adhered | slime adhered much | slime adhered much |
|  | 12 months | normal | normal | normal | normal | slime/shellfish slightly adhered | slime/shellfish slightly adhered | slime/shellfish adhered much | slime/shellfish adhered much |
|  | 18 months | normal | normal | normal | normal | slime/shellfish adhered much | slime/shellfish adhered much | slime/shellfish adhered much | slime/shellfish adhered much |
|  | 24 months | normal | normal | normal | normal | slime/shellfish adhered much | slime/shell-fish/sea lettuce adhered | slime/shell-fish/sea lettuce adhered | slime/shell-fish/sea lettuce adhered |
|  | 30 months | slime slightly adhered | slime slightly adhered | slime slightly adhered | slime slightly adhered | slime/shell-fish/sea lettuce adhered | slime/shell-fish/sea lettuce adhered | slime/shell-fish/sea lettuce adhered | slime/shell-fish/sea lettuce adhered |

What is claimed is:

1. A curable composition comprising:

(A) an organopolysiloxane represented by the formula:

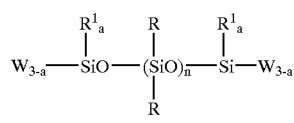  [α]

wherein W represents a hydroxyl group or a hydrolyzable group; each of $R^1$ and R independently represents an unsubstituted or substituted monovalent hydrocarbon group having 1 to 12 carbon atoms, provided that the hydrocarbon groups $R^1$ as well as the hydrocarbon groups R may be identical with or different from each other; n is an integer of 5 or greater; and a is 0, 1 or 2, (B) a hydrophobic silica, (D) at least one silicone oil selected from a silicone oil represented by the formula (II), a silicone oil having groups represented by the formula (III) and a silicone oil represented by the formula (IV),

  Formula (II):

wherein the groups $R^2$ may be identical with or different from each other, and each thereof represents a 1 to 10 carbon atoms having alkyl, aryl, aralkyl or fluoroalkyl; the groups $R^3$ may be identical with or different from each other, and each thereof represents a 1 to 10 carbon atoms having alkyl, aryl, aralkyl or fluoroalkyl; and n is a number of 0 to 150,

  Formula (III):

wherein $R^4$ represents an unsubstituted or substituted divalent hydrocarbon group or a divalent hydrocarbon group containing an ether bond; $R^5$ represents an unsubstituted or substituted monovalent hydrocarbon group; Y represents a hydrolyzable group; and b is 0, 1 or 2,

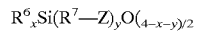  Formula (IV):

wherein $R^6$ represents a hydrogen atom or any of an alkyl group, an aryl group and an aralkyl group, these groups each having 1 to 10 carbon atoms; $R^7$ represents an ether group, an ester group or a divalent aliphatic hydrocarbon group having 1 to 10 carbon atoms between which —NH— may be present; z represents a monovalent polar group selected from among an amino group, a carboxyl group, an epoxy group and a polyethylene glycol or polypropylene glycol group whose terminal may be blocked with a 1 to 6 carbon atoms having alkyl or acyl; and x and y satisfy the relationship: $0.01 \leq x \leq 3.99$, $0.02 \leq y < 4$ and $0.02 \leq x+y < 4$, wherein said hydrophobic silica (B) is thermally treated at 100° C. or higher together with the organopolysiloxane (A).

2. The curable composition as claimed in claim 1, wherein, in the formula (α), W represents a hydroxyl group and a is 2, wherein the curable composition further comprises in addition to the components (A), (B), and (D):

(C) an organosilane represented by the formula:

  (I)

wherein $R^1$ represents an unsubstituted or substituted monovalent hydrocarbon group having 1 to 8 carbon atoms; X represents a hydrolyzable group; and b is 0 or 1, or a partial hydrolyzate of the organosilane.

3. The curable composition as claimed in claim 1, wherein the hydrophobic silica (B) is contained in an amount of 1 to 100 parts by weight per 100 parts by weight of the organopolysiloxane (A).

4. The curable composition as claimed in claim 2, wherein the organosilane or partial hydrolyzate thereof (C) is contained in an amount of 1 to 20 parts by weight per 100 parts by weight of the organopolysiloxane (A).

5. The curable composition as claimed in claim 1, wherein the silicone oil (D) is contained in an amount of 0.1 to 200 parts by weight per 100 parts by weight of the organopolysiloxane (A).

6. The curable composition as claimed in claim 1, further comprising any one or more of a catalyst, an antifouling agent or a colorant.

7. An antifouling paint comprising the curable composition claimed in claim 1.

8. A cured product of the curable composition claimed in claim 1.

9. An antifouling coating film comprising the curable composition claimed in claim 1.

10. An antifouling coated base material comprising a base material brought into contact with seawater or fresh water, having its surface covered with a coating film obtained by curing the curable composition claimed in claim 1.

11. An underwater structure comprising the antifouling base material as claimed in claim 10.

12. A ship shell plate comprising the antifouling base material as claimed in claim 10.

13. A fishing net comprising the antifouling base material as claimed in claim 10.

14. A fishing gear comprising the antifouling base material as claimed in claim 10.

15. A method of rendering a base material antifouling, comprising coating or impregnating a surface of a base material with an antifouling paint claimed in claim 7, and subsequently curing the coating composition to thereby form an antifouling coating film.

16. The method as claimed in claim 15, wherein the antifouling base material is subsequently used in any of underwater structures, ship shell plates, fishing nets and fishing gears.

* * * * *